(12) United States Patent
Sato et al.

(10) Patent No.: US 11,391,570 B2
(45) Date of Patent: Jul. 19, 2022

(54) INERTIAL MEASUREMENT UNIT

(71) Applicant: Seiko Epson Corporation, Tokyo (JP)

(72) Inventors: Kenta Sato, Shiojiri (JP); Yasushi Yoshikawa, Chino (JP)

(73) Assignee: Seiko Epson Corporation

( * ) Notice: Subject to any disclaimer, the term of this patent is extended or adjusted under 35 U.S.C. 154(b) by 46 days.

(21) Appl. No.: 17/034,287

(22) Filed: Sep. 28, 2020

(65) Prior Publication Data

US 2021/0095961 A1 Apr. 1, 2021

(30) Foreign Application Priority Data

Sep. 30, 2019 (JP) .............................. JP2019-178184

(51) Int. Cl.
 *G01C 19/56* (2012.01)
 *G06F 3/0346* (2013.01)

(52) U.S. Cl.
 CPC ........... *G01C 19/56* (2013.01); *G06F 3/0346* (2013.01); *G06F 2200/1614* (2013.01)

(58) Field of Classification Search
 None
 See application file for complete search history.

(56) References Cited

U.S. PATENT DOCUMENTS

| | | | | |
|---|---|---|---|---|
| 2014/0121567 | A1* | 5/2014 | Hasegawa | A61B 5/024 600/595 |
| 2016/0033279 | A1* | 2/2016 | Sato | G01C 22/006 701/510 |
| 2017/0191832 | A1* | 7/2017 | Kinoshita | G01P 1/023 |
| 2019/0117128 | A1* | 4/2019 | Chen | A61B 5/1121 |

FOREIGN PATENT DOCUMENTS

| | | |
|---|---|---|
| JP | H10-153515 A | 6/1998 |
| JP | 2002-133540 A | 5/2002 |
| JP | 2009-115538 A | 5/2009 |
| JP | 2014-062775 A | 4/2014 |
| JP | 2016-205868 A | 12/2016 |

* cited by examiner

*Primary Examiner* — Yi Wang
(74) *Attorney, Agent, or Firm* — Harness, Dickey & Pierce, P.L.C.

(57) ABSTRACT

An inertial measurement unit includes: a sensor unit having at least one inertial sensor; a display unit performing a display based on detection information from the inertial sensor; and a mode changeover switch. The mode changeover switch changes a display mode of the display unit.

14 Claims, 14 Drawing Sheets

*FIG. 10*

| VC | Peak Hz | Peak um |
|---|---|---|
| B | 60 | 1.23 |

⇩ um (DISPLACEMENT)
mm/s (VELOCITY)
Gal (ACCELERATION)

*FIG. 11*

User
60%

INERTIAL MEASUREMENT UNIT

The present application is based on, and claims priority from JP Application Serial Number 2019-178184, filed Sep. 30, 2019, the disclosure of which is hereby incorporated by reference herein in its entirety.

BACKGROUND

1. Technical Field

The present disclosure relates to an inertial measurement unit and the like.

2. Related Art

Recently, with the increasing precision of manufacturing devices and measuring devices or the like, vibration measurement to improve the efficiency and yield of production processes has become more important. Therefore, simplified device vibration measurement and ambient vibration measurement are desired. For example, JP-A-2016-205868 discloses a vibration monitoring device in which a vibration detection unit detects a vibration, using a vibration sensor, and wirelessly transmits vibration data acquired by the detection, and in which a vibration monitor receives the transmitted vibration data and displays the vibration data at a display unit. In this vibration monitoring device, the vibration detection unit detects a vibration of a device and an ambient vibration, and the detected vibration data can be displayed at the display unit of the vibration monitor provided separately from the vibration detection unit.

Using an inertial measurement unit having an inertial sensor such as an acceleration sensor or angular velocity sensor enables the monitoring of the state of a device or the monitoring of the ambient state as described above. However, when using the technique of displaying the result of the measurement by the inertial measurement unit at the display unit provided separately from the inertial measurement unit, as in JP-A-2016-205868, the user needs to check the result of the measurement by looking at the display unit provided separately from the inertial measurement unit. This makes the checking work complicated for the user. Also, since the content of information to be displayed at the display unit based on the detection information from the inertial sensor varies depending on the user using the inertial measurement unit, various demands about the display form of the display information need to be met.

SUMMARY

An aspect of the present disclosure relates to an inertial measurement unit including: a sensor unit having at least one inertial sensor; a display unit performing a display based on detection information from the inertial sensor; and a mode changeover switch. The mode changeover switch changes a display mode of the display unit.

BRIEF DESCRIPTION OF THE DRAWINGS

FIG. 10 is an explanatory view showing a changeover of display mode.

FIG. 11 is an explanatory view showing a changeover of display mode.

DESCRIPTION OF EXEMPLARY EMBODIMENTS

An embodiment will now be described. The embodiment described below does not unduly limit the contents described in the appended claims. Not all the components described in the embodiment are essential components.

1. Inertial Measurement Unit

Figure 1:
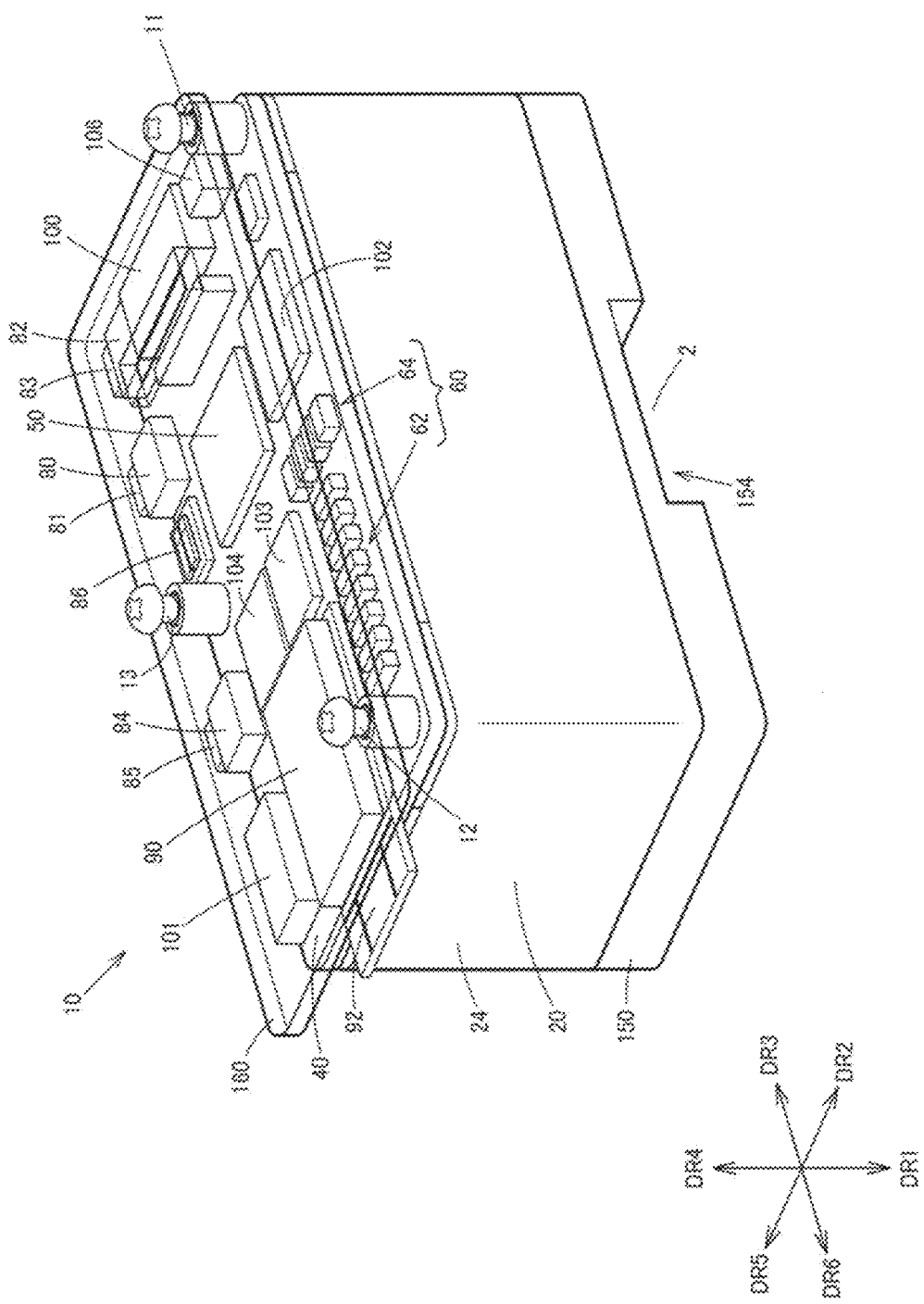
FIG. 1 is a perspective view showing a configuration example of an inertial measurement unit according to an embodiment.

FIG. 1 is a perspective view showing a configuration example of an inertial measurement unit 10 according to this embodiment. The inertial measurement unit (IMU) 10 includes a sensor unit 20. The inertial measurement unit 10 can also include fixing members 11, 12, 13, a substrate 40, a base 150, and a protection plate 160. In FIG. 1, a direction from the inertial measurement unit 10 toward an installation surface 2 for the inertial measurement unit 10 is defined as a direction DR1, and a direction orthogonal to DR1 is defined as a direction DR2. The direction DR1 is a direction orthogonal to the installation surface 2 and, for example, orthogonal to a main surface of the sensor unit 20. The main surface is a top surface or bottom surface of the sensor unit 20 and, for example, a surface orthogonal to a lateral surface. A direction DR3 is a direction orthogonal to the direction DR1 and the direction DR2. Directions DR4, DR5, DR6 are the opposite directions of the directions DR1, DR2, DR3, respectively. The directions DR1, DR2, DR3, DR4, DR5, DR6 are a first direction, a second direction, a third direction, a fourth direction, a fifth direction, and a sixth direction, respectively.

Figure 15:
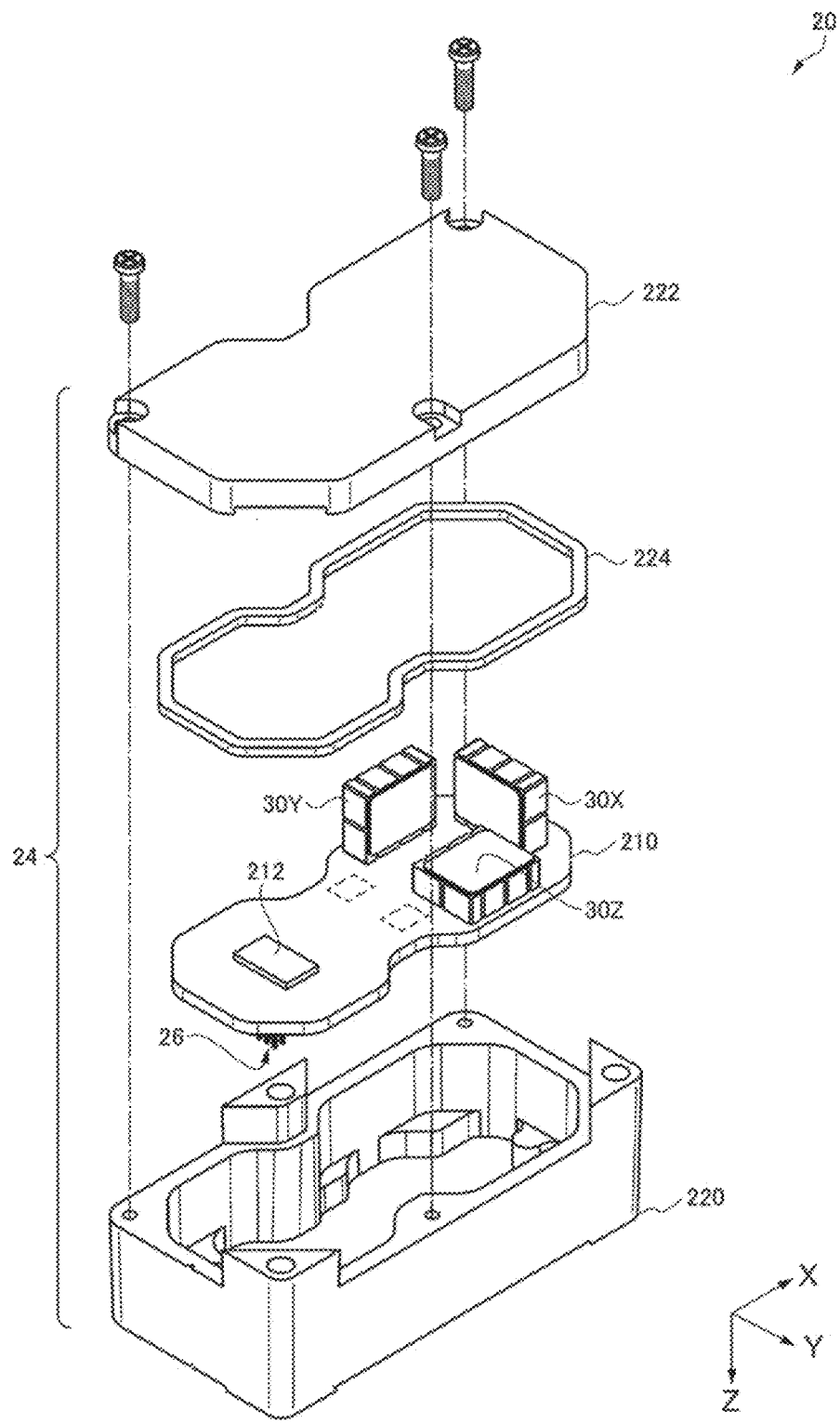
FIG. 15 is an exploded perspective view of a first configuration example of a sensor unit.
Figure 16:
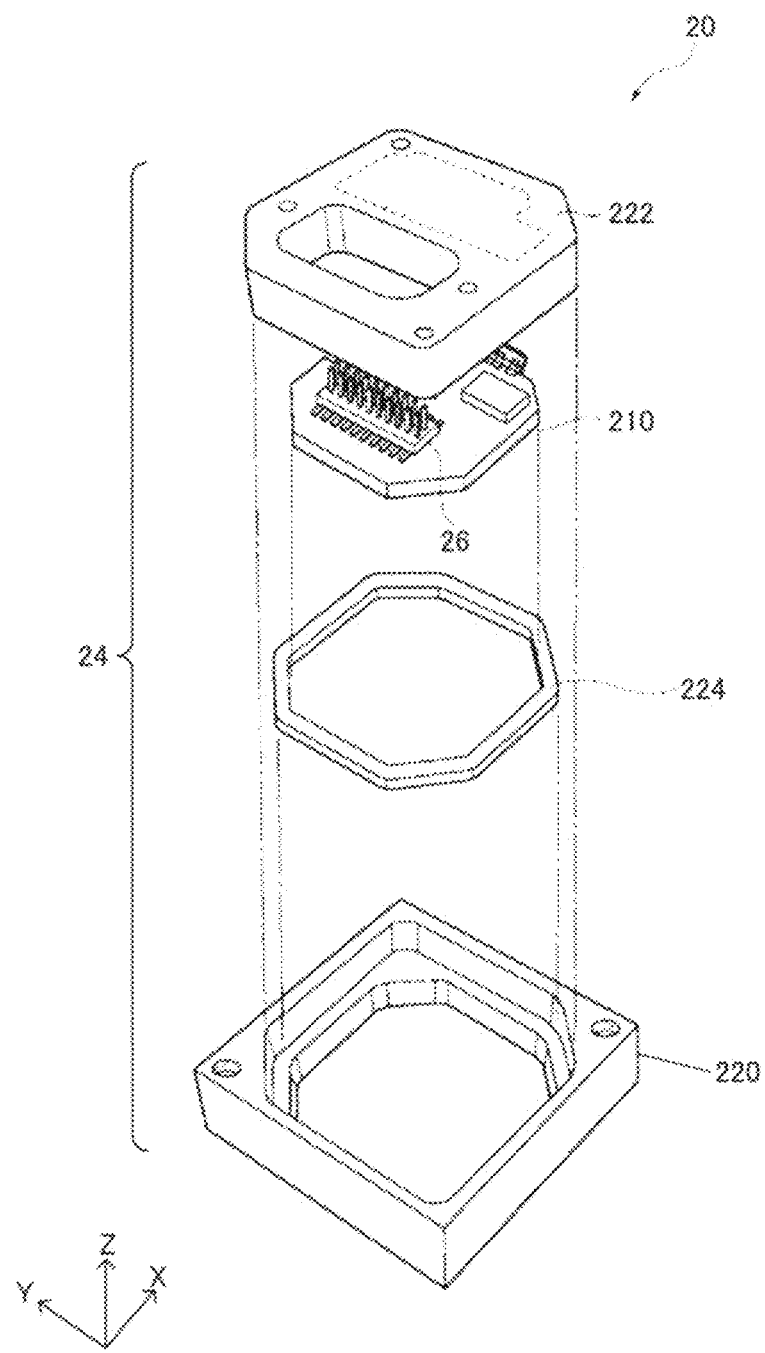
FIG. 16 is an exploded perspective view of a second configuration example of the sensor unit.
Figure 17:
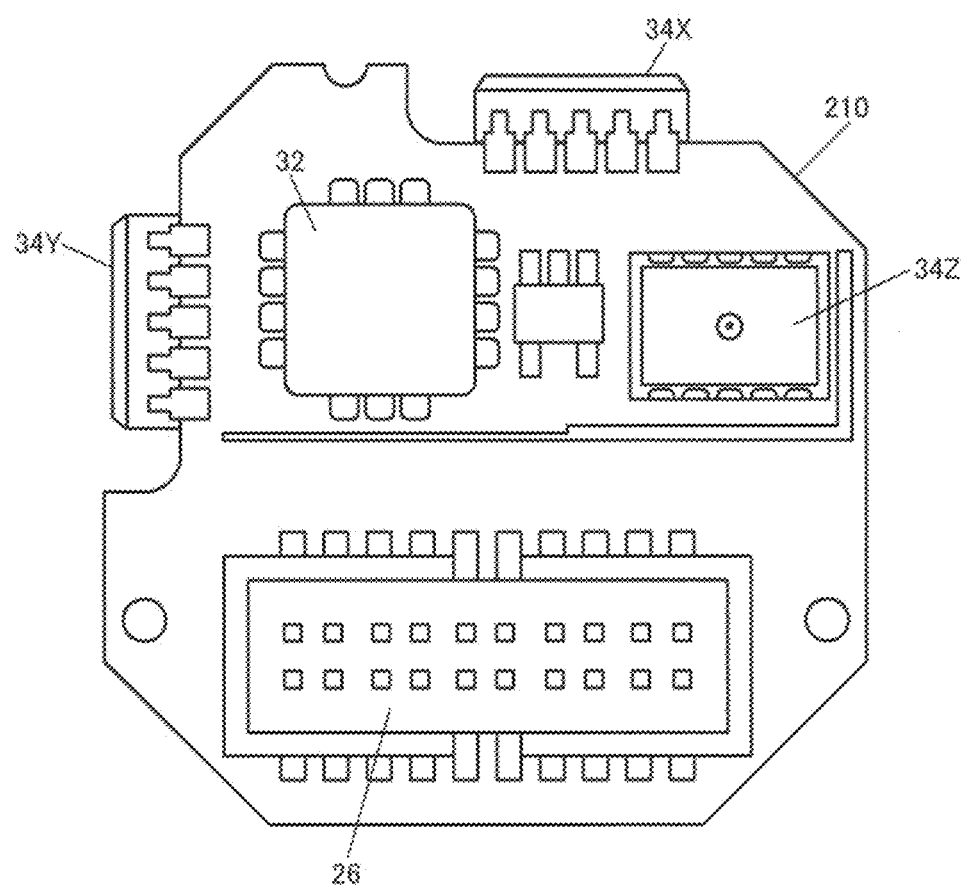
FIG. 17 is a plan view of a sensor substrate in the second configuration example.

The sensor unit 20 includes at least one inertial sensor. The inertial sensor is a physical quantity sensor detecting physical quantity information. Specifically, as described later with reference to FIGS. 15, 16, and 17, the sensor unit 20 includes at least one acceleration sensor, as at least one inertial sensor. Alternatively, the sensor unit 20 includes at least one acceleration sensor and at least one angular velocity sensor, as at least one inertial sensor. The angular velocity sensor is, for example, a gyro sensor. The inertial sensor is not limited to the acceleration sensor or the angular velocity sensor and may be any sensor configured to detect information about inertia by any detection technique. The inertial sensor may be a physical quantity sensor configured to detect a physical quantity equivalent to an acceleration or angular velocity. The inertial sensor may be, for example, a physical quantity sensor configured to detect a physical quantity such as a velocity or angular acceleration. The sensor unit 20 includes a case 24. For example, the sensor unit 20 includes a sensor substrate 210 provided with at least one inertial sensor, and the case 24 accommodating the sensor substrate 210, as shown in FIGS. 15 to 17, described later. The case 24 is formed of an electrically conductive member such as a metal and is provided with the sensor substrate 210 in an accommodation space inside the case 24.

The substrate 40 is provided with at least one of a processing unit 50 and a display unit 60. In FIG. 1, both of the processing unit 50 and the display unit 60 are provided at the substrate 40. However, for example, only the processing unit 50 may be provided at the substrate 40, or only the display unit 60 may be provided at the substrate 40. The substrate 40 is a circuit board, for example, a printed circuit board where a metal wiring is formed. The substrate 40 is, for example, a rigid substrate.

The processing unit 50 performs processing based on detection information from the inertial sensor of the sensor unit 20. The processing unit 50 is a processing circuit and can be implemented by a processor such as an MPU or CPU. Alternatively, the processing unit 50 may be implemented by an ASIC (application-specific integrated circuit) by automatic placement and routing of a gate array or the like. For example, the processing unit 50 is electrically coupled to the inertial sensor of the sensor unit 20 via a connector or the like, as described later. The detection information from the inertial sensor is inputted to the processing unit 50 via the connector or the like. The detection information is, for example, acceleration information, angular velocity information, or information based on these pieces of information. The processing unit 50 performs various kinds of processing based on the detection information from the inertial sensor. For example, the processing unit 50 performs processing to process the detection information. For example, the processing unit 50 performs processing to process the detection information into information that is appropriate as display information to be displayed at the display unit 60 or at a display unit 70 shown in FIG. 2, described later. The processing unit 50 also performs analysis processing to analyze the detection information. For example, the processing unit 50 performs analysis processing to analyze a vibration, tilt, or attitude or the like of a measuring target, based on the detection information from the inertial sensor. For example, the processing unit 50 performs FFT analysis (Fast Fourier Transform analysis) and thus analyzes a frequency component of vibration information or the like, as the analysis processing.

Figure 2:
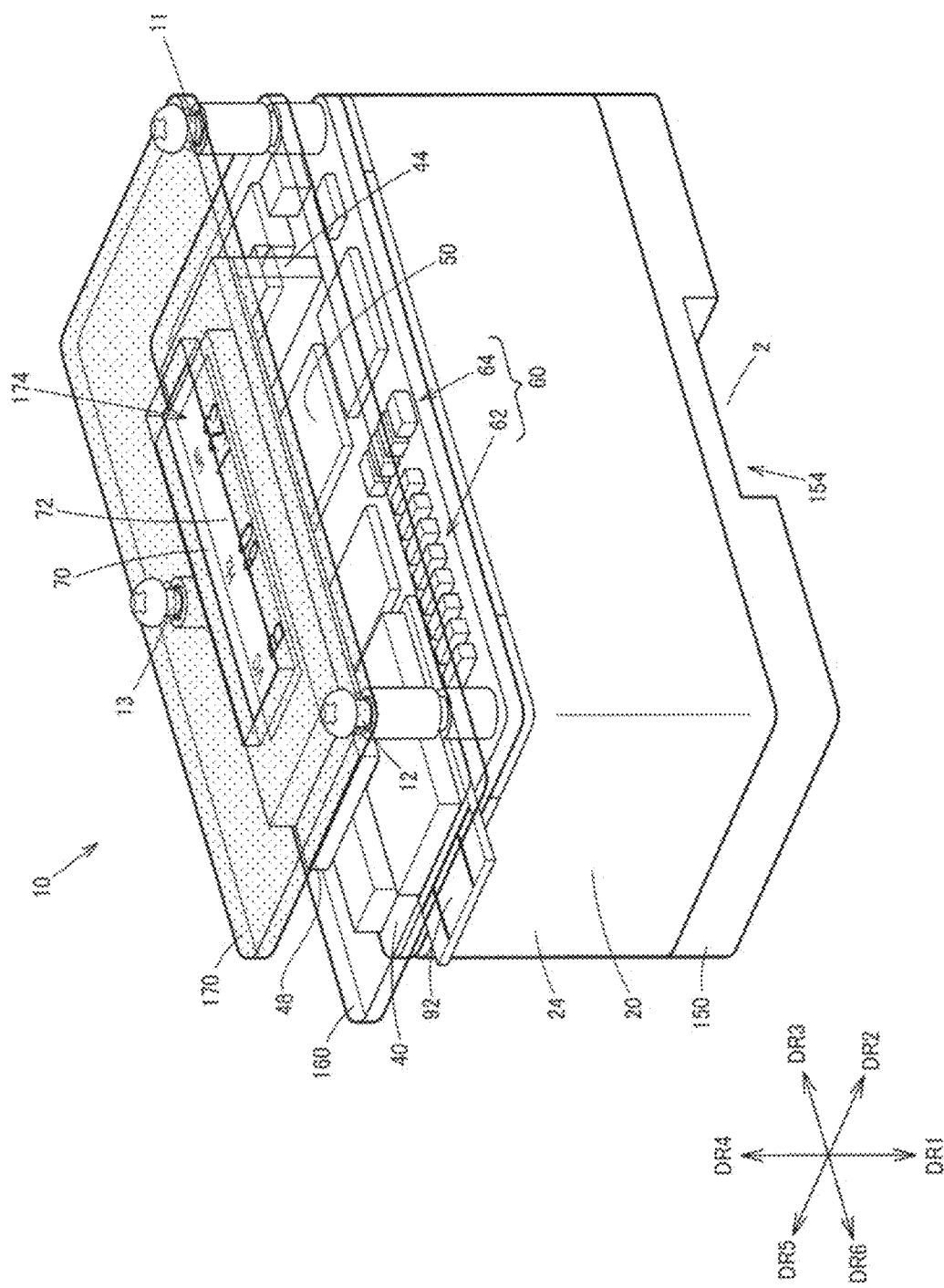
FIG. 2 is a perspective view showing another configuration example of the inertial measurement unit according to the embodiment.

The display unit 60 in FIG. 1 and the display unit in FIG. 2 perform a display based on the detection information from the inertial sensor of the sensor unit 20. For example, when the inertial measurement unit 10 has the processing unit 50 and the display units 60, 70, the processing unit 50 performs processing based on the detection information from the inertial sensor, and the display units 60, 70 performs a display based on the result of the processing by the processing unit 50. For example, display information based on the result of the processing on the detection information by the processing unit 50 is displayed at the display units 60, 70. For example, when the processing unit 50 performs processing to process the detection information, the display units 60, 70 display display information corresponding to the processed detection information. When the processing unit 50 performs analysis processing to analyze the detection information, the display units 60, 70 display display information corresponding to the result of the analysis. For example, in FIG. 1, the display unit 60, which is a display device, has light-emitting element groups 62, 64. The light-emitting element of the light-emitting element groups 62, 64 is an element converting an electrical signal into a light signal and can be implemented by a semiconductor element such as a light-emitting diode (LED). Alternatively, the light-emitting element may be implemented by other elements than the semiconductor element. In FIG. 2, the display unit 70, which is a display module, has a display panel 72. The display panel 72 is, for example, an organic EL panel, liquid crystal panel or the like.

The substrate 40 is also provided with a mode changeover switch 80, a reset switch 82, and a measurement start switch 84. The substrate 40 is also provided with a wireless communication unit 90 and an antenna unit 92. These switches and the wireless communication unit 90 and the like will be described in detail later.

The substrate 40 is also provided with an interface unit 100. The interface unit 100 performs wired communicates with outside. For example, the interface unit 100 implements a communication interface such as UART (universal asynchronous receiver/transmitter), GPIO (general-purpose input/output), or SPI (serial peripheral interface). The UART is an asynchronous serial communication interface. The GPIO is a general-purpose communication interface whose operation can be controlled by the user at the time of execution. The SPI is an interface communicating via three or four signal lines including a serial clock signal line, a serial data signal line and the like. The substrate 40 is also provided with an interface unit 101 implementing a JTAG or similar communication interface.

The substrate 40 is also provided with memories 102, 103, 104. The memory 102 is, for example, a non-volatile memory and is implemented, for example, by an EEPROM (electrically erasable programmable read-only memory) where data is electrically erasable, or an OTP (one time programmable) memory using a FAMOS (floating-gate avalanche injection MOS) or the like. The memories 103, 104 are, for example, SRAMs temporarily storing data. The substrate 40 is also provided with a power interface 106. External power is supplied to the inertial measurement unit 10 via the power interface 106.

The inertial measurement unit 10 includes the base 150. The base 150 is a member for installing the inertial measurement unit 10 at the installation surface 2. For example, the sensor unit 20 is provided between the base 150 and the substrate 40, and the base 150 is fixed to the sensor unit 20 by the fixing members 11, 12, 13, which are at least one fixing member. For example, the base 150 is provided between the sensor unit 20 and the installation surface 2. The installation surface 2 is, for example, a surface of a device such as a manufacturing device or a measuring device, or a floor surface where the device is installed. The base 150 has a recess 154 at a bottom surface, which is the surface facing the installation surface 2. In cases such as where the inertial measurement unit 10 is installed at the installation surface 2 via a double-sided adhesive tape, the provision of such a recess 154 can make it easier to strip off the double-sided adhesive tape. The sensor unit 20 is provided in contact with the top surface of the base 150.

The protection plate 160 is a member for protecting the substrate 40. The substrate 40 is provided between the sensor unit 20 and the protection plate 160. Thus, the components installed at the substrate 40 such as the processing unit 50, the display unit 60, and the wireless communication unit 90 can be protected using the protection plate 160. For example, the protection plate 160, which is a first protection plate, is a transparent or semitransparent plate-like member and can be implemented, for example, by a resin plate of acryl or the like. The protection plate 160 may be formed of other materials than acryl. The protection plate 160 may be, for example, a resin plate of ABS or PET, or may be formed of other materials than resin.

The inertial measurement unit 10 includes at least one fixing member removably fixing the sensor unit 20 and the substrate 40 together. Specifically, in FIG. 1, the inertial measurement unit 10 includes the fixing members 11, 12, 13 as at least one fixing member. Although the three fixing members 11, 12, 13 are provided in FIG. 1, the number of fixing members may be two or fewer, or four or more. In FIG. 1, columnar members are provided as the fixing members 11, 12, 13. That is, the fixing members 11, 12, 13 are columnar members having the longitudinal direction thereof along the direction DR1. As described later, the columnar members are provided in such a way as to penetrate holes in the sensor unit 20, the substrate 40 and the like.

FIG. 2 shows another configuration example of the inertial measurement unit 10. In FIG. 2, a substrate 48 is provided in addition to the configuration shown in FIG. 1. The substrate 48 is provided with the display unit 70 having the display panel 72. The display panel 72, which is an organic EL panel or liquid crystal panel, performs a display based on the detection information from the sensor unit 20. For example, the processing unit 50 provided at the substrate 40, which is a first substrate, performs analysis processing to analyze a vibration or the like of a measuring target such as a device or floor surface, based on the detection information from the inertial sensor of the sensor unit 20. The display unit 70 provided at the substrate 48, which is a second substrate, displays information about the result of the analysis processing. For example, the display unit 70 displays information about the result of analysis such as FFT on the vibration of the measuring target. The display unit 70 displays, for example, information about a peak frequency or peak value of the vibration.

In FIG. 2, a protection plate 170 is provided in addition to the protection plate 160. The protection plate 170 is, for example, a protection member for the substrate 48. For example, the substrate 48 is provided between the protection plate 160 and the protection plate 170. Thus, the protection plate 170 and the like installed at the substrate 48 can be protected using the protection plate 170. For example, the protection plate 170, which is a second protection plate, is a transparent or semitransparent plate-like member and can be implemented, for example, by a resin plate of acryl or the like. The protection plate 170 as the second protection plate may be formed of other materials than acryl and may be formed of other materials than resin, similarly to the protection plate 160 as the first protection plate. In this way, in FIG. 2, the substrate 48 is provided between the protection plate 160 and the protection plate 170, and the substrate 40 is provided between the sensor unit 20 and the protection plate 160.

The protection plate 170 is provided with a window 174. At the position of this window 174, the display unit 70 installed at the substrate 48 is arranged. This enables the user to view the information displayed at the display unit 70, via the window 174.

Figure 3:
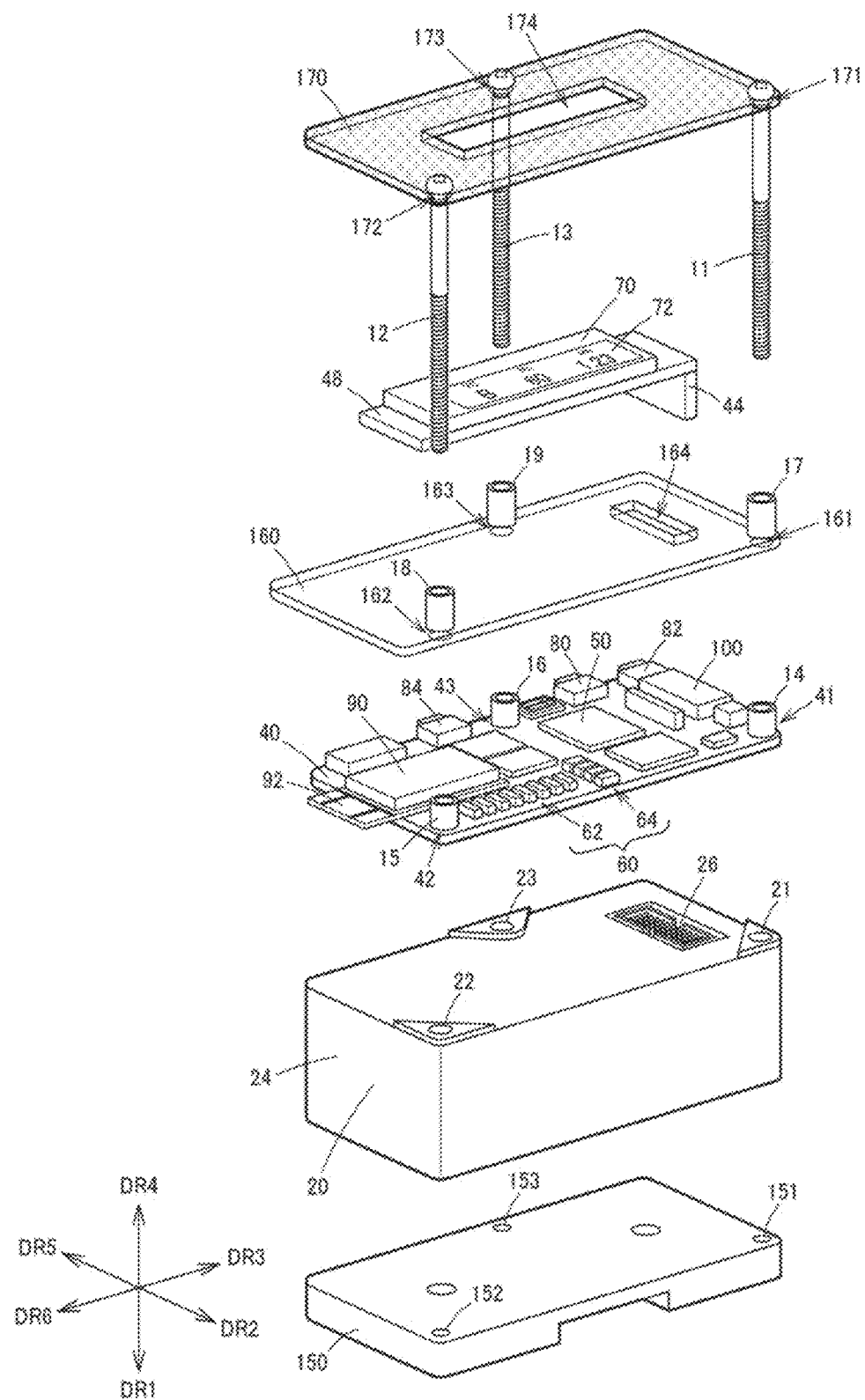
FIG. 3 is an exploded perspective view of the inertial measurement unit.

FIG. 3 is an exploded perspective view of the inertial measurement unit 10. As shown in FIG. 3, the sensor unit 20 is provided with a plurality of holes 21, 22, 23, and the substrate 40 is provided with a plurality of holes 41, 42, 43. As the fixing members 11, 12, 13, which are columnar members, fit into the plurality of holes 41, 42, 43 provided in the substrate 40 and the plurality of holes 21, 22, 23 provided in the sensor unit 20, the sensor unit 20 and the substrate 40 are removably fixed together. Specifically, the fixing members 11, 12, 13 are provided in such a way as to penetrate the holes 41, 42, 43 in the substrate 40 and the holes 21, 22, 23 in the sensor unit 20. Also, the base 150 is provided with holes 151, 152, 153. As the fixing members 11, 12, 13, which are columnar members, fit into the holes 151, 152, 153 provided in the base 150, the base 150 is fixed to the sensor unit 20. Also, the protection plate 160 is provided with a plurality of holes 161, 162, 163 and the protection plate 170 is provided with a plurality of holes 171, 172, 173. As the fixing members 11, 12, 13 fit into the holes 161, 162, 163 and the holes 171, 172, 173, the protection plates 160, 170 are removably fixed together.

For example, the fixing members 11, 12, 13, which are columnar members, are screw members. That is, the fixing members 11, 12, 13 are male screws threaded on the outer circumference. The holes 151, 152, 153 in the base 150 are female screws threaded on the inner circumference. Thus, the distal ends of the fixing members 11, 12, 13, which are screw members, can be screwed into the holes 151, 152, 153 in the base 150. This enables the fixing of the sensor unit 20, the substrate 40, the protection plates 160, 170 and the like to the base 150. The holes 21, 22, 23 in the sensor unit 20, the holes 161, 162, 163 in the protection plate 160, and the holes 171, 172, 173 in the protection plate 170 are not threaded on the inner circumference. However, a modified embodiment where these holes are threaded can be employed as well.

As shown in FIG. 3, spacers 14, 15, 16 are provided at positions corresponding to the holes 41, 42, 43 in the substrate 40. Also, spacers 17, 18, 19 are provided at positions corresponding to the holes 161, 162, 163 in the protection plate 160. When fixing, the fixing members 11, 12, 13 penetrate the holes in these spacers 14, 15, 16, 17, 18, 19. Providing such spacers 14, 15, 16, 17, 18, 19 enables provision of a space between the substrate 40 and the protection plate 160 and between the protection plate 160 and the protection plate 170.

Also, a modified embodiment where the holes in the spacers 14, 15, 16, 17, 18, 19 are formed as female screws threaded on the inner circumference can be employed as well. As shown in FIG. 3, the substrate 48 can be installed as supported by the substrate 40 using a support part 44. The protection plate 160 is provided with a slit 164. As the support part 44 is installed in such a way as to penetrate the slit 164, the protection plate 160 is arranged between the substrate 40 and the substrate 48.

Figure 4:
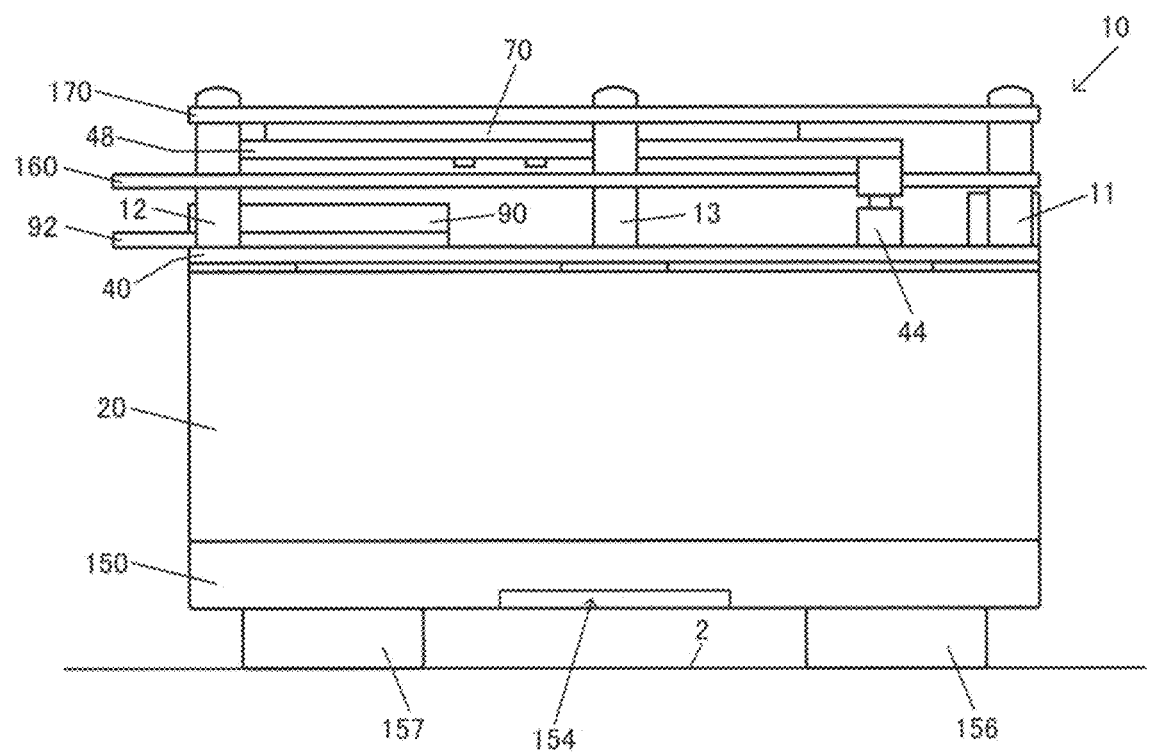
FIG. 4 is a side view of the inertial measurement unit.
Figure 5:
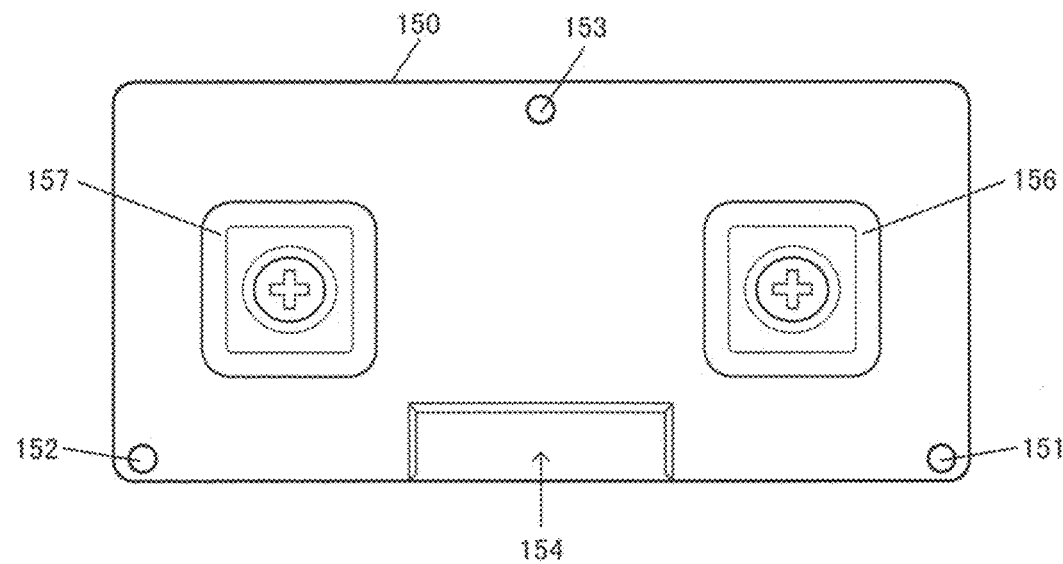
FIG. 5 is a bottom view of the inertial measurement unit.

FIG. 4 is a side view of the inertial measurement unit 10. FIG. 5 is a bottom view. As shown in FIG. 4, the sensor unit 20 is provided between the base 150 and the substrate 40. The substrate 40 is provided between the sensor unit 20 and the protection plate 160. The substrate is provided between the protection plate 160 and the protection plate 170. As described with reference to FIG. 3, the fixing members 11, 12, 13, which are columnar members, are provided in such a way as to fit into the holes provided in each of the base 150, the sensor unit 20, the substrate 40, the protection plate 160, the substrate 48, and the protection plate 170. Thus, these members can be removably fixed.

As shown in FIGS. 4 and 5, the base 150 has fixing parts 156, 157 at the bottom surface thereof facing the installation surface 2. The fixing parts 156, 157 are magnets, that is, magnetic bodies. The fixing parts 156, 157 are attached to the bottom surface of the base 150, for example, with a screw. Thus, the fixing parts 156, 157 can be removably attached to the base 150. For example, the fixing parts 156, 157 are cubic. The bottom surfaces of the fixing parts 156, 157 come into contact with the installation surface 2. As such fixing parts 156, 157, which are magnets, are provided at the bottom surface of the base 150, the inertial measurement unit 10 can be easily installed, for example, at a metal surface or the like of a device by the magnetic force of the magnets.

Figure 6:
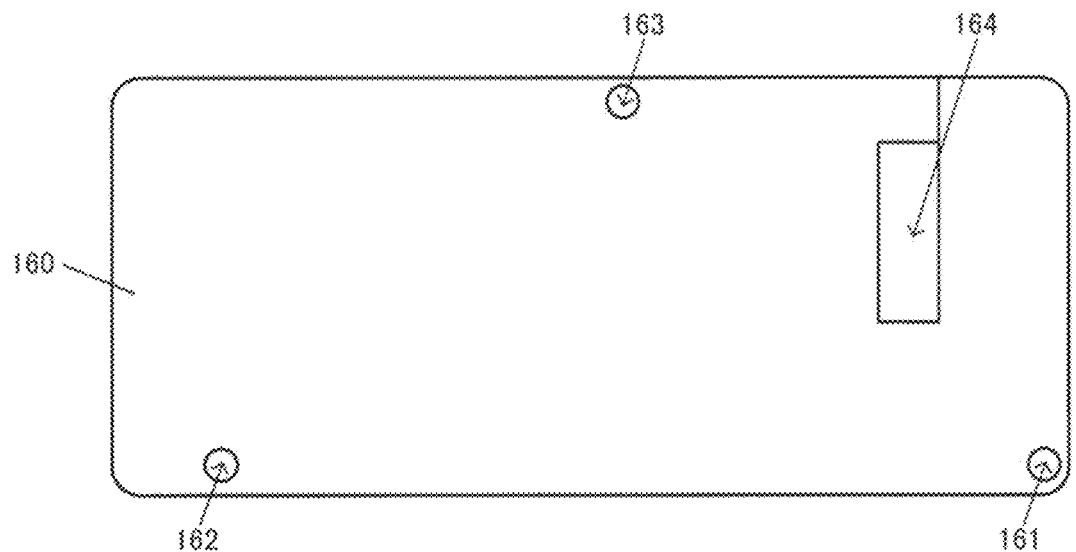
FIG. 6 is a plan view of a protection plate.

FIG. 6 is a plan view of the protection plate 160. As shown in FIG. 6, the protection plate 160 is provided with the holes 161, 162, 163 to be penetrated by the fixing members 11, 12, 13, which are columnar members. The protection plate 160 is also provided with the slit 164 to be penetrated by the support part 44 for supporting the substrate 48. In FIG. 6, the protection plate 160 is shown as a transparent plate-like member.

Figure 7:
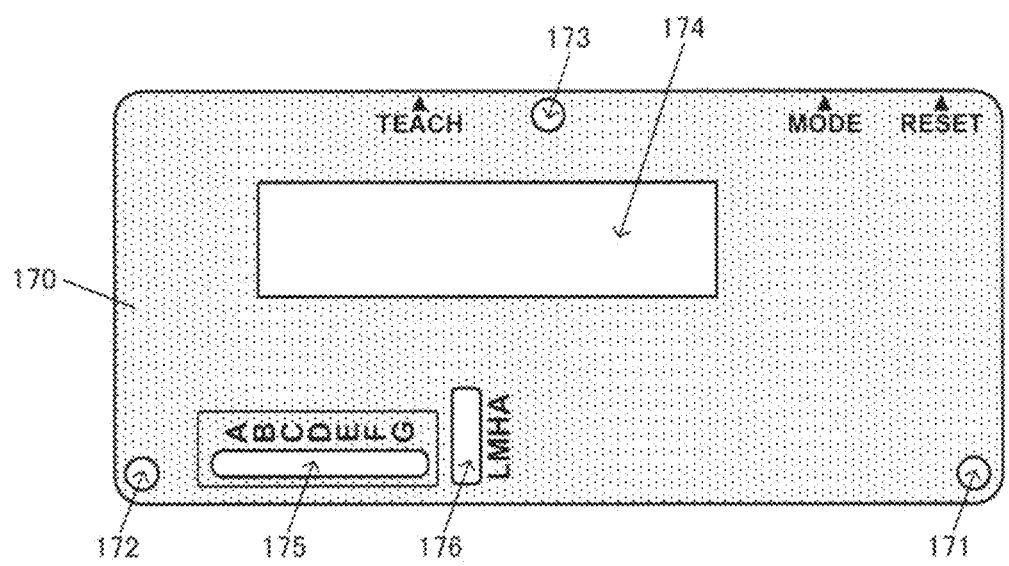
FIG. 7 is a plan view of a protection plate.

FIG. 7 is a plan view of the protection plate 170. As shown in FIG. 7, the protection plate 170 is provided with the holes 171, 172, 173 to be penetrated by the fixing members 11, 12, 13. The screw heads of the fixing members 11, 12, 13, which are screw members, are located above the holes 171, 172, 173, as shown in FIG. 3. The protection plate 170 is also provided with the window 174 so that the user can view the display unit 70 below. The protection plate 170 is also provided with windows 175, 176 so that the user can view the light-emitting element groups 62, 64 of the display unit 60 below. In FIG. 7, the protection plate 170 is shown as a semitransparent plate-like member colored in a predetermined color such as blue. On the protection plate 170, letters for explaining the functions of switches, described later, and letters for notifying the content of display information at the light-emitting element groups 62, 64, are written.

Figure 8:
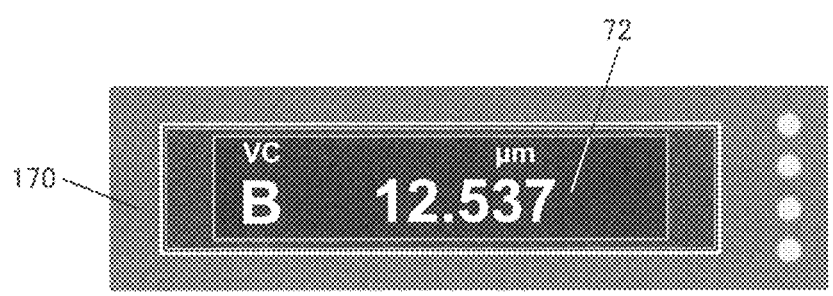
FIG. 8 is a plan view of a display unit.

FIG. 8 is a plan view of the display unit 70. The display unit 70 has the display panel 72. A signal line for transmitting a drive signal for the display panel 72 is electrically coupled to a coupling terminal in the display unit 70 from the substrate 40 below, via the support part 44 and the substrate 48. This coupling terminal is provided, for example, on the right side of the display panel 72 as viewed in FIG. 8.

As described above, the inertial measurement unit 10 according to this embodiment includes: the sensor unit 20 having at least one inertial sensor; the substrate 40 provided with at least one of the processing unit 50 performing processing based on detection information from the inertial sensor and the display unit 60 performing a display based on the detection information; and at least one fixing member 11, 12, 13 removably fixing the sensor unit 20 and the substrate 40 together.

In the inertial measurement unit 10 according to this embodiment, the processing unit 50 provided at the substrate 40 can execute processing based on detection information from the inertial sensor of the sensor unit 20, and the display unit 60 provided at the substrate 40 can perform a display based on the detection information. In FIG. 1, the display unit 60 having the light-emitting element groups 62, 64 is provided at the substrate 40. However, the display unit 70 having the display panel 72 may be provided at the substrate 40, as shown in FIG. 2.

In this embodiment, the sensor unit 20 and the substrate 40 are removably fixed together using the fixing members 11, 12, 13, as shown in FIG. 3. For example, the sensor unit 20 and the substrate 40 are fixed together in a freely removable manner. Thus, the type of the sensor unit 20 and the type of the substrate 40 incorporated into the inertial measurement unit 10 can be freely changed. For example, the sensor unit 20 having an acceleration sensor can be incorporated into the inertial measurement unit 10, or the sensor unit 20 having both of an acceleration sensor and an angular velocity sensor, or the like, can be incorporated into the inertial measurement unit 10. Alternatively, the substrate 40 provided only with the processing unit 50 can be incorporated into the inertial measurement unit 10, or the substrate 40 provided only with the display unit 60 can be incorporated into the inertial measurement unit 10. Also, the substrate 40 provided with both of the processing unit 50 and the display unit 60, or the like, can be incorporated into the inertial measurement unit 10. Thus, various demands by the user using the inertial measurement unit 10 can be met and the extensibility of the inertial measurement unit 10 can be improved. Also, the inertial measurement unit 10 can be installed at the installation surface 2 in the state where the sensor unit 20 and the substrate 40 are firmly fixed together via the fixing members 11, 12, 13. Therefore, a situation where an unwanted vibration or the like due to resonance or the like is transmitted to the inertial measurement unit 10 and adversely affects the measurement by the inertial measurement unit 10 can be restrained. Thus, the inertial measurement unit 10 in which extensibility can be improved while deterioration in the accuracy of measurement is restrained can be provided.

For example, according to the related art, the sensor unit 20 itself is used as the inertial measurement unit 10, and the detection information from the inertial sensor of the sensor unit 20 is outputted from a connector 26 shown in FIGS. 15 to 17, described later. For example, acceleration information and angular velocity information detected by the inertial sensor are outputted directly as the detection information. However, handling the detection information from the inertial sensor is difficult and needs expertise, and therefore has the problem of poor user-friendliness. In this case, a technique such as coupling a PC (personal computer) to the connector 26 of the sensor unit 20, then using the PC to perform various kinds of processing such as analysis processing on the detection information, and displaying the result of the analysis at the display unit, may be employed. However, in this technique, the PC needs to be coupled to the sensor unit 20 to perform various kinds of work. Therefore, the technique has a problem in that the work becomes complicated and that the scale of the measuring system increases.

In contrast, in this embodiment, the sensor unit 20 and the substrate 40 are fixed together via the fixing members 11, 12, 13, thus forming the inertial measurement unit 10. Therefore, processing such as analysis processing on detection information from the inertial sensor of the sensor unit 20 can be performed using the processing unit 50 provided at the substrate 40, and a display based on the detection information can be performed using the display unit 60 provided at the substrate 40. For example, there is no need to couple a PC to the inertial measurement unit 10 to perform processing based on detection information or to perform a display based on the detection information. Therefore, user-friendliness can be improved. That is, simply installing the inertial measurement unit 10 to a measuring target enables processing based on detection information or a display based on the detection information. For example, when the measuring target is a device such as a manufacturing device or measuring device, or a floor surface where the device is installed, the inertial measurement unit 10 is installed on the installation surface 2 that is a surface of the device or the floor surface. Then, the processing unit 50 executes processing to analyze a vibration of the device or the floor surface. Information about the result of the processing can be outputted to outside via the wireless communication unit 90 and the interface unit 100, or the result of the analysis can be displayed at the display unit 60. Thus, the state of the measuring target can be monitored by a highly portable, low-cost and small-scale system.

For example, for a user who needs only acceleration information, the inertial measurement unit 10 in which the sensor unit 20 provided with an acceleration sensor as an inertial sensor and the substrate 40 are fixed together via the fixing members 11, 12, 13 is provided. For a user who need both of acceleration information and angular velocity information, the inertial measurement unit 10 in which the sensor unit 20 provided with both of an acceleration sensor and an angular velocity sensor as an inertial sensor and the substrate 40 are fixed together via the fixing members 11, 12, 13 is provided. For a user who wants the display unit 70 having the display panel 72, the inertial measurement unit 10 in which the sensor unit 20, the substrate 40, and the substrate 48 provided with the display unit 70 are fixed together via the fixing members 11, 12, 13, as shown in FIG. 2, is provided. In this way, the inertial measurement unit 10 meeting various demands by the user can be provided and the extensibility of the inertial measurement unit 10 can be increased. Also, since the inertial measurement unit 10 in which the sensor unit 20 and the substrate 40 are firmly fixed together via the fixing members 11, 12, 13 can be provided, it is advantageous in that deterioration in the accuracy of the result of measurement by the inertial measurement unit 10 due to an unwanted vibration or the like such as resonance can be restrained.

In FIGS. 1 and 2, both of the processing unit 50 and the display unit 60 are provided at the substrate 40. However, at least one of the processing unit 50 and the display unit 60 may be provided at the substrate 40. For example, when the processing unit 50 is not provided at the substrate 40, processing based on detection information may be performed, for example, using a processing unit 212, described later, provided in the sensor unit 20. Alternatively, the processing unit 50 may be provided at the substrate 48 located above the substrate 40. The display unit 60 may be provided at the substrate 48 instead of at the substrate 40. Alternatively, the display unit 60 using a light-emitting element may not be provided as a display unit in the inertial measurement unit 10. The display unit 70 having the display panel 72 may be provided at the substrate 40.

In this embodiment, as shown in FIG. 3, the inertial measurement unit 10 includes a plurality of columnar members as the fixing members 11, 12, 13. As the fixing members 11, 12, 13, which are the plurality columnar members, fit into the plurality of holes 41, 42, 43 provided in the substrate 40 and the plurality of holes 21, 22, 23 provided in the sensor unit 20, the sensor unit 20 and the substrate 40 are removably fixed together. Thus, various combinations of sensor unit 20 and substrate 40 can be freely attached or removed from each other and removable fixing of the sensor unit 20 and the substrate 40 can be realized. For example, replacing the sensor unit 20 with a sensor unit of a different type and inserting the fixing members 11, 12, 13 into the holes 21, 22, 23 in the sensor unit can change the type of the sensor unit 20. Also, replacing the substrate 40 with a substrate of a different type and inserting the fixing members 11, 12, 13 into the holes 41, 42, 43 in the substrate can change the type of the substrate 40. Thus, sensor units 20 and substrates 40 of various types can be provided as option parts for the user, and the extensibility of the inertial measurement unit 10 can be significantly improved.

For example, the fixing members 11, 12, 13, which are a plurality of columnar members, are screw members. For example, the fixing members 11, 12, 13 are male screws threaded on the outer circumference. Using screw members as the fixing members 11, 12, 13 in this way enables screw-fixing with the screw members. Therefore, the sensor unit 20, the substrate 40 and the like can be fixed firmly and stably. Thus, deterioration in the accuracy of the result of measurement by the inertial measurement unit 10 due to an unwanted vibration or the like caused by resonance or the like can be restrained further. Also, the work of attaching the sensor unit 20, the substrate 40 and the like becomes easier and work efficiency or the like is improved.

The inertial measurement unit 10 also includes the base 150 for installing the inertial measurement unit 10 at the installation surface 2. The sensor unit 20 is provided between the base 150 and the substrate 40. The base 150 is fixed to the sensor unit 20 via at least one fixing member 11, 12, 13. For example, the base 150 is a member serving as a base stand for installing the inertial measurement unit 10 at the installation surface 2. As the bottom surface or the like of the base 150 comes into contact with the installation surface 2, the inertial measurement unit 10 is installed on the installation surface 2. The installation surface 2 is, for example, a surface of a device such as a manufacturing device or measuring device, or a floor surface or the like where the device is installed. The installation surface 2 is a surface of a measuring target. The sensor unit 20 is fixed by the fixing members 11, 12, 13 in such a way as to be held between the substrate 40 and the base 150. Such fixing can restrain deterioration in the accuracy of detection of the inertial sensor of the sensor unit 20 due to a vibration or the like caused by resonance or the like. Even when the bottom surface of the sensor unit 20 does not have a suitable shape for installation on the installation surface 2, the bottom surface of the base 150 instead of the bottom surface of the sensor unit 20 can be attached to the installation surface 2, and this enables table installation of the inertial measurement unit 10. For example, stable installation can be achieved regardless of the shape and type of the sensor unit 20, and detection errors or the like due to wobbly installation can be prevented.

As shown in FIGS. 4 and 5, the base 150 has the fixing parts 156, 157, which are magnets, on the surface facing the installation surface 2. That is, the fixing parts 156, 157 for fixing the inertial measurement unit 10 to the installation surface 2 are provided at the bottom surface of the base 150. These fixing parts 156, 157 are magnets. For example, the fixing parts 156, 157 are cubic magnets. Thus, the bottom surfaces of the fixing parts 156, 157 are attracted to a metal surface or the like of a device, as the installation surface 2, by the magnetic force of the magnets. Therefore, simply bringing the bottom surfaces of the fixing parts 156, 157 into contact with the installation surface 2 enables the inertial measurement unit 10 to be fixed and installed at the installation surface 2 by the magnets. This makes it easier for the user to carry out installation work and can improve work efficiency.

Although FIGS. 4 and 5 show an example where the number of the fixing parts 156, 157 is two, the number of fixing parts is not limited to this and may be, for example, three or more. The base 150 itself or a part of the base 150 may be a magnet.

As shown in FIGS. 4 and 5, the base 150 has the recess 154 on the surface facing the installation surface 2. That is, the bottom surface, which is the surface facing the installation surface 2, of the base 150 has the recess 154 recessed in the direction DR4, which is the opposite direction of the direction DR1. In cases such as where the inertial measurement unit 10 is installed at the installation surface 2 via a double-sided adhesive tape, the provision of such a recess 154 can make it easier to strip off the double-sided adhesive tape. That is, in this embodiment, the inertial measurement unit 10 can be installed at the installation surface 2, using a double-sided adhesive tape instead of using the fixing parts 156, 157. Specifically, one side of the double-sided adhesive tape is attached to the bottom surface of the base 150, and the other side of the double-sided adhesive tape is attached to the installation surface 2. Thus, the inertial measurement unit 10 can be installed at the installation surface 2 by simple work and can be installed at the installation surface 2 even when, for example, the installation surface 2 is not a metal surface. In this case, after measurement is finished and the inertial measurement unit 10 is removed from the installation surface 2, the double-sided adhesive tape needs to be stripped off from the bottom surface of the base 150. In this regard, the provision of the recess 154 at the bottom surface of the base 150 enables the user as a worker to insert a finger or the like into this recess 154 and thus easily strip off the double-sided adhesive tape from the bottom surface of the base 150. The inertial measurement unit 10 can also be installed via a screw as well as the magnets and the double-sided adhesive tape.

As shown in FIGS. 1 and 2, the substrate 40 is provided with the wireless communication unit 90 wirelessly transmitting information based on detection information from the inertial sensor. For example, a wireless communication IC that is the wireless communication unit 90 is provided at the substrate 40. The wireless communication unit 90 transmits the information based on the detection information from the inertial sensor, to outside. For example, when the processing unit 50 performs processing such as analysis processing based on the detection information from the inertial sensor, the wireless communication unit 90 transmits information about the result of the processing, to outside. Alternatively, the wireless communication unit 90 may transmit the detection information itself from the inertial sensor, to outside. Thus, the information based on the detection information from the inertial sensor can be wirelessly transmitted to an external device, even without coupling the inertial measurement unit 10 and the external device together via a wire. For example, the information based on the detection information detected by the inertial sensor can be transmitted to the external device, using the wireless communication unit 90, in the state where the inertial measurement unit 10 remains installed at the installation surface 2. Therefore, improved convenience or the like can be achieved.

The substrate 40 is also provided with the interface unit 100 for wired communication with outside. For example, the interface unit 100 communicates with outside by such a communication interface format as UART, GPIO or SPI. For example, the interface unit 100 transmits information based on detection information from the inertial sensor, to an external device. The provision of such an interface unit 100 can meet various demands by the user with respect to the communication interface. For example, UART can be converted to RS-232C so as to couple the inertial measurement unit 10 to various devices. Also, UART can be converted to Ethernet (trademark registered). Moreover, the inertial measurement unit 10 can be coupled to an SD (trademark registered) card slot device, using SPI. Thus, user-friendliness can be improved.

The substrate 40 is also provided with at least one of the mode changeover switch 80 for changing the mode of the inertial measurement unit 10, the reset switch 82 for resetting the inertial measurement unit 10, and the measurement start switch 84 for starting measurement by the inertial measurement unit 10. In FIGS. 1 and 2, all of these switches are provided. However, in this embodiment, at least one of these switches may be provided. As such various switches are provided, the user can operate each of these switches to cause the inertial measurement unit 10 to carry out various operations. This can make the measuring work simpler and more efficient. When the user operates the mode changeover switch 80, the inertial measurement unit 10 switches between various modes. Specifically, the display mode in the display units 60, 70 is changed. When the user operates the reset switch 82, the inertial measurement unit 10 becomes reset. When the user operates the measurement start switch 84, the inertial measurement unit 10 starts measurement. The measurement start switch 84 also functions as a measurement end switch. For example, when the user presses the measurement start switch 84 before starting measurement, the inertial measurement unit 10 shifts into a state monitoring mode and starts measurement. Then, when the user presses measurement start switch 84 again, the state monitoring mode ends. The measurement start switch 84 also functions as a teach switch, as described later.

The inertial measurement unit 10 also includes the protection plate 160. The substrate 40 is provided between the sensor unit 20 and the protection plate 160. For example, the protection plate 160 is arranged above the substrate 40, that is, in the direction DR4 from the substrate 40, via a gap space formed by the spacers 14, 15, 16. Thus, a dustproof function by the protection plate 160 can be realized. Also, the protection plate 160, as a protection member, can prevent an unwanted impact from being applied to the components arranged at the substrate 40, such as the processing unit 50, the display unit 60, and the wireless communication unit 90. Also, for example, in FIG. 1, the user can hold the inertial measurement unit 10 in a hand with its palm in contact with the top surface of the protection plate 160 and thus install the inertial measurement unit 10 at the installation surface 2. The provision of the protection plate 160 makes it easier for the user to manually hold the inertial measurement unit 10 and thus makes the installation work easier and more efficient.

The inertial measurement unit 10 includes, as a substrate, the substrate 40 as the first substrate, and the substrate 48 as the second substrate, as shown in FIG. 2. The substrate 40 as the first substrate is provided with the processing unit 50. The substrate 48 as the second substrate is provided with the display unit 70 having the display panel 72. Thus, for example, processing based on detection information from the inertial sensor of the sensor unit 20 is executed by the processing unit 50 provided at the substrate 40, and information about the result of the processing can be displayed on the display panel 72 of the display unit 70 provided at the substrate 48. That is, the information based on the detection information can be displayed on the display panel 72. The display panel 72 is formed of an organic EL panel or liquid crystal panel and therefore can perform a more detailed and advanced display of information than when a light-emitting element is used. For example, numbers and letters about a measured value can be displayed and more precise and advanced changeover processing about the display mode can be implemented. Thus, user-friendliness can be improved. Also, a modified embodiment where the display unit 70 having the display panel 72 is provided at the substrate 40 can be employed.

The inertial measurement unit 10 also includes the protection plate 160 as the first protection plate, and the protection plate 170 as the second protection plate. The substrate 40 is provided between the sensor unit 20 and the protection plate 160. The substrate 48 is provided between the protection plate 160 and the protection plate 170. For example, as shown in FIG. 3, the protection plate 170 is arranged above the protection plate 160, that is, in the direction DR4 from the protection plate 160, via a gap space formed by the spacers 17, 18, 19 provided at the holes 161, 162, 163 in the protection plate 160. The substrate 48 is arranged in this gap space. Thus, the protection plate 160 can protect the components provided at the substrate 40. For example, the components provided at the substrate 40, such as the processing unit 50, the wireless communication unit 90, and the display unit 60, can be protected. The protection plate 170 can protect the components provided at the substrate 48. For example, the components provided at the substrate 48, such as the display unit 70, can be protected. Thus, damage or the like to the components of the inertial measurement unit 10, for example, due to a touch by the user, can be effectively prevented.

The substrate 40 is also provided with the display unit 60 having the light-emitting element groups 62, 64. That is, the display unit 60 formed of the light-emitting element groups 62, 64 such as LEDs is provided. Thus, the display of information based on detection information from the inertial sensor of the sensor unit 20 can be implemented via an indication operation based on light emission of the light-emitting elements of the light-emitting element groups 62, 64. For example, information about whether the result of measurement satisfies a determination criterion or not, or the like, can be sufficiently communicated via light emission of the light-emitting elements. The light-emitting elements are available at a lower cost than the display panel 72 and therefore can achieve cost reduction or the like of the inertial measurement unit 10.

2. Switches

Figure 9:
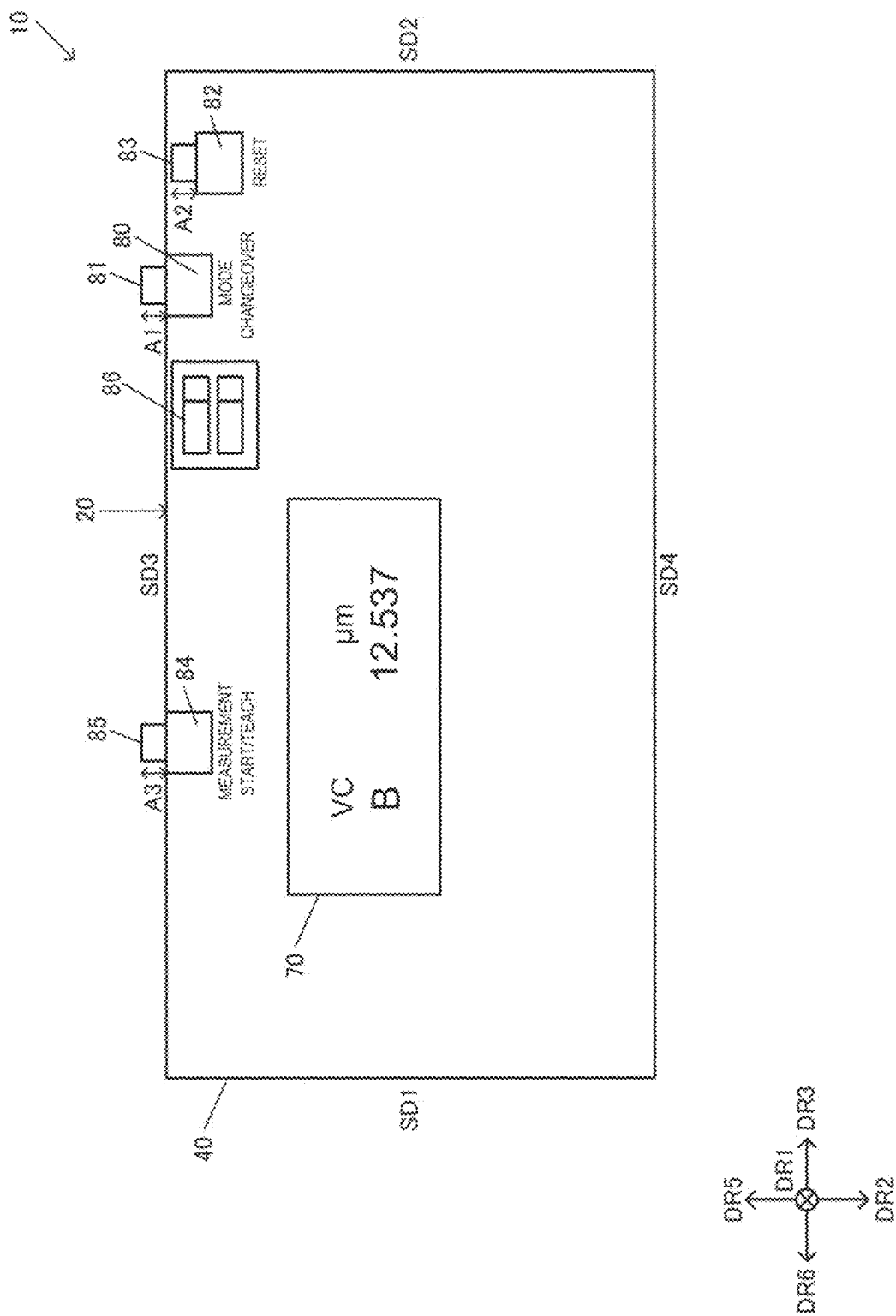
FIG. 9 is an explanatory view of a mode changeover switch, a reset switch, and a measurement start switch.

In this embodiment, the user holds the inertial measurement unit 10 in such a way that the bottom surface of the inertial measurement unit 10 comes into contact with the installation surface 2, then installs the inertial measurement unit 10, using a double-sided adhesive tape, magnet, screw or the like, and carries out measurement with the inertial measurement unit 10. In this case, it is desired that, when measuring with the inertial measurement unit 10, the user can easily carry out operations such as mode setting and measurement start instruction for the inertial measurement unit 10. Thus, in this embodiment, the inertial measurement unit 10 is provided with various switches such as the mode changeover switch 80, the reset switch 82, and the measurement start switch 84, as shown in FIG. 9. The mode changeover switch 80 is a switch for changing the mode of the inertial measurement unit 10 and specifically a switch for changing the display mode of the display unit 70. For example, the mode changeover switch 80 is a switch for changing the mode of display information. The reset switch 82 is a switch for resetting the inertial measurement unit 10. Pressing the reset switch 82 initializes the inertial measurement unit 10. The measurement start switch 84 is a switch for starting measurement by the inertial measurement unit 10. The measurement start switch 84 also functions as a switch for ending measurement by the inertial measurement unit 10. When long-pressed, the measurement start switch 84 functions as a teach switch for giving an instruction to store measurement criteria information for inertial measurement into a memory. Also, the mode changeover switch 80, when long-pressed, functions as a switch for saving measurement log data. A slide switch 86 is a switch for selecting wireless communication and a communication interface.

The display unit 70 performs a display based on detection information from the inertial sensor of the sensor unit 20. For example, in FIG. 9, the display unit 70 shows that a measured vibration satisfies VC-B of VC (vibration criteria), which are ambient vibration criteria. The display unit 70 also shows information about vibration displacement. In this embodiment, the display mode of the display unit 70 changes via the mode changeover switch 80. For example, in FIG. 10, the display unit 70 shows a result of determination based on the VC standard. For example, the display unit 70 shows the result of determination that a measured vibration satisfies VC-B. That is, in a first display mode in FIG. 10, the result of determination based on a first determination criterion is displayed. Meanwhile, in FIG. 11, the display unit 70 shows a result of measurement based on a determination criterion set by the user. For example, the display unit 70 shows the result of determination that what percentage of a threshold set by the user is reached. That is, in a second display mode in FIG. 11, the result of determination based on a second determination criterion is displayed. For example, pressing the mode changeover switch 80 results in the first display mode in FIG. 10 or the second display mode in FIG. 11.

Also, the unit of information displayed based on detection information from the inertial sensor changes via the mode changeover switch 80. That is, the display mode changes in terms of unit via the mode changeover switch 80. For example, in FIG. 10, the unit of vibration displacement, μm, is shown. Specifically, a peak frequency of vibration displacement and the vibration displacement at the peak frequency are shown. Pressing the mode changeover switch 80 changes the display of the unit to a display of the unit of vibration velocity, mm/s, or a display of the unit of vibration acceleration, Gal. Specifically, pressing the mode changeover switch 80 results in a display of a peak frequency of vibration velocity and the vibration velocity at the peak frequency, or a display of a peak frequency of vibration acceleration and the vibration acceleration at the peak frequency. For example, the result of determination based on VC is displayed at the beginning, and every time the mode changeover switch 80 is pressed, the display mode sequentially changes to the display of vibration acceleration and peak frequency thereof, the display of vibration velocity and peak frequency thereof, the display of vibration displacement and peak frequency thereof, and the display of the measured value in percentage terms to the threshold set by the user.

VC, which are ambient vibration criteria, define VC-A, VC-B, VC-C, VC-D, VC-E and the like. Showing which of these is satisfied enables the user to easily grasp the vibration level of an ambient vibration or the like. The threshold set by the user is stored, for example, into the memory 102 in FIG. 1, which is a non-volatile memory, for example, based on the setup by the user. Alternatively, a threshold may be set via the teach switch, described later.

As shown in FIG. 9, the mode changeover switch 80 has a moving part 81. The moving part 81 is implemented, for example, by a push-button. It is now assumed that the direction from the inertial measurement unit 10 toward the installation surface 2 is defined as DR1 and that a direction orthogonal to the direction DR1 is defined as DR2. The direction DR1 is a first direction. The direction DR2 is a second direction. The direction DR2 is, for example, a direction along the main surface, that is, the top surface of the sensor unit 20 and the main surface, that is, the top surface of the substrate 40, and for example, along the shorter sides of the sensor unit 20 and the substrate 40. In this case, the moving part 81 is movable in the direction DR2. That is, the push-button as the moving part 81 is movable and can be pressed along a directions indicated by A1 in FIG. 9. The movement of the moving part 81 of the mode changeover switch 80 gives an instruction to change the display mode of the display unit 70. That is, pressing the push-button as the moving part 81 results in the change in the display mode described with reference to FIGS. 10 and 11.

The moving part 81 of the mode changeover switch 80, when not pressed, protrudes from a side of the sensor unit 20 as viewed in a plan view in the direction DR1. For example, in FIG. 9, a side SD1 is a first shorter side of the substrate 40, and a side SD2 is a second shorter side opposite the side SD1. A side SD3 is a first longer side of the substrate 40, and a side SD4 is a second longer side opposite the side SD3. The mode changeover switch 80 is arranged on the side SD3, which is a longer side of the substrate 40. The reset switch 82 and the measurement start switch 84, too, are arranged on the side SD3. That is, the mode changeover switch 80, the reset switch 82, and the measurement start switch 84 are arrayed along the side SD3. The moving part 81 of the mode changeover switch 80, when not pressed, protrudes from the side SD3 of the substrate 40 and also protrudes from the side of the sensor unit 20 corresponding to the side SD3 of the substrate 40, as viewed in a plan view. That is, when not pressed, the push-button as the moving part 81 protrudes from the side SD3. Thus, for example, when the user holds the inertial measurement unit 10 with the palm in contact with the top surface thereof, the user can press the moving part 81, for example, using a finger of the hand. Therefore, while holding the inertial measurement unit 10, the user can press the push-button as the moving part 81 of the mode changeover switch 80 with a finger of the hand and thus can easily change the display mode of the display unit 70. For example, the user can attach the bottom surface of the inertial measurement unit 10 to the installation surface 2 and operate the mode changeover switch 80 with a hand's finger. Therefore, user-friendliness can be improved.

The reset switch 82 similarly has a moving part 83. The moving part 83 can be pressed along directions indicated by A2 in FIG. 9. However, the moving part 83, when not pressed, does not protrude from the side SD3 of the substrate 40 and does not protrude from the side of the sensor unit 20 and the side of the protection plate 160 corresponding to the side SD3, either. That is, since pressing the moving part 83 of the reset switch 82 initializes the inertial measurement unit 10, the moving part 83 does not protrude from the side SD3. Thus, the user can be prevented from making an erroneous operation such as making a reset operation by mistake.

The measurement start switch 84 similarly has a moving part 85 movable in the direction DR2. The movement of the moving part 85 of the measurement start switch 84 gives an instruction to start measurement by the inertial measurement unit 10. That is, a push-button that is the moving part 85 can be moved and pressed along directions indicated by A3 in FIG. 9. Pressing the push-button as the moving part 85 starts measurement by the inertial measurement unit 10. Then, pressing the push-button as the moving part 85 again after the measurement is started ends the measurement. That is, the measurement start switch 84 also functions as a measurement end switch.

The moving part 85 of the measurement start switch 84, when not pressed, protrudes from the side SD3 of the substrate 40 and protrudes from the side of the sensor unit 20 corresponding to the side SD3, as viewed in a plan view. That is, when not pressed, the push-button as the moving part 85 protrudes from the side SD3. Thus, for example, when the user holds the inertial measurement unit 10 with the palm in contact with the top surface thereof, the user can press the moving part 85, for example, using a finger of the hand. Therefore, while holding the inertial measurement unit 10, the user can press the push-button as the moving part 85 of the measurement start switch 84 with a finger of the hand and thus can easily start measurement. Therefore, user-friendliness can be improved.

In this embodiment, the measurement start switch 84 also functions as a teach switch, which is a switch for giving an instruction to store measurement criteria information for inertial measurement into the memory 102. That is, the measurement start switch 84 functions as a teach switch for causing the inertial measurement unit 10 to learn measurement criteria information. Specifically, for example, a long press on the measurement start switch 84 by the user causes the measurement start switch 84 to functions as a teach switch. When the measurement start switch 84 functions as a teach switch, the teach switch has the moving part 85 movable in the direction DR2 and the movement of the moving part 85 of the teach switch gives an instruction to store measurement criteria information into the memory 102. Specifically, a long press on the measurement start switch 84 causes the inertial measurement unit 10 to shift to a learning mode, which is a teach mode. Then, the inertial measurement unit 10 performs measurement for learning during a predetermined learning period. Based on an average value or the like of measured values measured during the learning period, a threshold that serves as measurement criteria information is found. The threshold is stored as measurement criteria information into the memory 102, which is a non-volatile memory. In actual measurement by the inertial measurement unit 10, determination processing is performed using the threshold as the measurement criteria information, and the result of the determination is displayed at the display unit 70. For example, the display as shown in FIG. 11 is performed.

As described above, the inertial measurement unit 10 according to this embodiment includes the sensor unit 20 having at least one inertial sensor, the display unit 70 performing a display based on detection information from the inertial sensor, and the mode changeover switch 80. The display mode of the display unit 70 changes via the mode changeover switch 80. For example, the changeover of the display mode as described with reference to FIGS. 10 and 11 is carried out. For example, the mode of display information at the display unit 70 is changed.

In the inertial measurement unit 10 of such a configuration, the display unit 70 provided in the inertial measurement unit 10 can perform a display based on detection information from the inertial sensor of the sensor unit. For example, simply installing the inertial measurement unit 10 on a measurement target enables the display unit 70 to display information based on detection information. Therefore, there is no need to couple the inertial measurement unit 10 to a PC and cause the display unit of the PC to perform a display based on detection information. Thus, the work of checking the result of measurement can be simplified and user-friendliness can be improved. When the user operates the mode changeover switch 80 provided in the inertial measurement unit 10, the display mode of the display unit 70 changes. Specifically, as described with reference to FIGS. 10 and 11, when the user operates the mode changeover switch 80, a change of the display mode takes place, such as displaying the result of determination about measurement at the display unit 70, based on a different determination criterion, or changing the unit of information displayed at the display unit 70. The simple operation of operating the mode changeover switch 80 can change the display mode of the display unit 70 in various forms. Thus, various demands about the display form of the result of measurement can be met and user-friendliness can be improved further.

In the inertial measurement unit 10 having the configuration described with reference to FIG. 9, the mode changeover switch 80 need not necessarily be provided at the substrate 40 and may be provided, for example, at other substrates than the substrate 40. For example, the mode changeover switch 80 may be provided at the substrate 48, where the display unit 70 is provided, instead of the substrate 40, where the processing unit 50 or the like is provided. Alternatively, various modified embodiments, for example, installing the mode changeover switch 80 at the top surface of the sensor unit 20, can be employed.

As shown in FIG. 9, the mode changeover switch 80 has the moving part 81 movable in the direction DR2, which is orthogonal to the direction DR1 from the inertial measurement unit 10 toward the installation surface 2. The movement of the moving part 81 of the mode changeover switch 80 gives an instruction to change the display mode of the display unit 70. Thus, for example, the user can hold the inertial measurement unit 10 with the palm in contact with the top surface thereof and can move the moving part 81 in the direction DR2 parallel to the top surface of the inertial measurement unit 10, thus giving an instruction to change the display mode of the display unit 70. Therefore, the user can give an instruction to change the display mode by a simple operation and can cause the display unit 70 to display information based on detection information from the inertial sensor, in a display mode desired by the user.

The moving part 81 of the mode changeover switch 80, when not pressed, protrudes from a side of the sensor unit 20 as viewed in a plan view along the direction DR1. Thus, for example, when the user holds the inertial measurement unit 10 with the palm in contact with the top surface thereof, the moving part 81 of the mode changeover switch 80 is in a protruding state when not pressed. Therefore, while holding the inertial measurement unit 10, the user can press the protruding moving part 81, for example, with a finger of the hand, thus causing the display mode of the display unit 70 to change. The simple operation of pressing the moving part 81 protruding in a direction parallel to the top surface of the sensor unit 20 when not pressed, changes the display mode of the display unit 70. Thus, user-friendliness can be improved.

The inertial measurement unit 10 also includes the measurement start switch 84 for starting measurement by the inertial measurement unit 10. As such a measurement start switch 84 is provided, processing of giving a command to start measurement via a PC or the like is not needed. When wishing to start measurement, the user can start measurement by the inertial measurement unit 10 by the simple operation of pressing the measurement start switch 84.

The measurement start switch 84 has the moving part 85 movable in the direction DR2, which is orthogonal to the direction DR1 toward the installation surface 2. The movement of the moving part 85 of the measurement start switch 84 gives an instruction to start measurement by the inertial measurement unit 10. Thus, for example, the user can hold the inertial measurement unit 10 with the palm in contact with the top surface thereof and can move the moving part 85 in the direction DR2 parallel to the top surface, thus giving an instruction to start measurement by the inertial measurement unit 10. Therefore, the user can give an instruction to start measurement by the inertial measurement unit 10 by a simple operation at a timing desired by the user.

The inertial measurement unit 10 also includes the memory 102 and the teach switch for giving an instruction to store measurement criteria information for inertial measurement into the memory 102. In FIG. 9, for example, the measurement start switch 84 is also used as the teach switch. When the measurement start switch 84 is long-pressed, the leaning mode sets in and a threshold as the measurement criteria information for inertial measurement is stored into the memory 102. Then, for example, the processing unit 50 performs determination processing about measurement based on the threshold as the determination criterion, or the display unit 70 displays the result of the determination about measurement based on the threshold as the determination criterion. Thus, the inertial measurement unit 10 can be made to learn measurement criteria information corresponding to the state of a device as a measuring target or the ambient state, and can perform measurement using the measurement criteria information.

The teach switch, also used as the measurement start switch 84, has the moving part 85 movable in the direction DR2. The movement of the moving part 85 of the teach switch gives an instruction to store measurement criteria information into the memory 102. Thus, for example, the user can hold the inertial measurement unit 10 with the palm in contact with the top surface thereof and can move the moving part 85 in the direction DR2 parallel to the top surface, thus giving an instruction to store measurement criteria information into the memory 102. Therefore, the user can cause the inertial measurement unit 10 to learn measurement criteria information during a period when the user wants the inertial measurement unit 10 to learn the measurement criteria information.

The inertial measurement unit 10 also includes the substrate 40 provided with the mode changeover switch 80. For example, the mode changeover switch 80 is provided at the substrate 40 where the processing unit 50 or the display unit 60 or the like is provided. For example, the mode changeover switch 80 is mounted at the substrate 40 arranged parallel to the top surface of the sensor unit 20. Thus, the mode changeover switch 80 can be mounted in a compact form in the inertial measurement unit 10. Particularly, making the direction of movement of the moving part 81 of the mode changeover switch 80 parallel to the surface of the substrate 40 enables the mode changeover switch 80 to be mounted compactly.

As described with reference to FIGS. 1 and 2 or the like, the inertial measurement unit 10 includes at least one fixing member 11, 12, 13 for removably fixing the sensor unit 20 and the substrate 40 together. That is, the sensor unit 20 having the inertial sensor, and the substrate 40 provided with the mode changeover switch 80, are removably fixed together via the fixing members 11, 12, 13. Thus, the type of the sensor unit 20 and the type of the substrate 40 incorporated in the inertial measurement unit 10 can be freely changed, and the extensibility of the inertial measurement unit 10 can be improved. The inertial measurement unit 10 can be installed at the installation surface 2 in the state where the sensor unit 20 and the substrate 40 are fixed together via the fixing members 11, 12, 13. Therefore, a situation where an unwanted vibration or the like due to resonance or the like is transmitted to the inertial measurement unit 10 and adversely affects the measurement can be restrained.

Also, the inertial measurement unit 10 includes the substrate 40 as the first substrate, and the substrate 48 as the second substrate. The mode changeover switch 80 is provided at the substrate 40. The display unit 70 is provided at the substrate 48. The substrate 40 is provided between the sensor unit 20 and the substrate 48. Thus, when the mode changeover switch 80 provided at the substrate 40 is operated, the display mode of the display unit 70 provided at the substrate 48 changes. The mode changeover switch 80 is provided at the substrate 40 provided between the sensor unit 20 and the substrate 48 and therefore is arranged, for example, near the center in the direction of the height of the inertial measurement unit 10. Therefore, the operability of the mode changeover switch 80 can be improved. Meanwhile, the display unit 70 is provided at the substrate 48 arranged above the substrate 40, that is, in the direction DR4 from the substrate 40, and therefore can be arranged at a position visible to the user.

In the first display mode, the display unit 70 displays the result of determination based on the first determination criterion, as the result of determination in determination processing based on detection information. In the second display mode, the display unit 70 displays the result of determination based on the second determination criterion. For example, in the first display mode, the display unit 70 displays the result of determination as shown in FIG. 10, and in the second display mode, the display unit 70 displays the result of determination as shown in FIG. 11. Thus, the display mode can be switched between the first display mode, in which the result of determination based on the first determination criterion is displayed, and the second display mode, in which the result of determination based on the second determination criterion is displayed, via the mode changeover switch 80. Therefore, as the user operates the mode changeover switch 80, the result of determination about measurement is displayed at the display unit 70, based on different determination criteria. This enables presentation of the result of determination based on various determination criteria to the user.

In this case, the first determination criterion is a determination criterion of VC (vibration criteria) and the second determination criterion is a determination criterion set by the user. For example, in the first display mode, the result of determination is displayed based on the determination criterion of VC as the first determination criterion, as shown in FIG. 10. For example, which of VC-A, VC-B, VC-C, VC-D, VC-E and the like as indicators of ambient vibration criteria is satisfied by a vibration measured by the inertial measurement unit 10 is displayed. Meanwhile, in the second display mode, the result of determination is displayed based on the determination criterion set by the user, as shown in FIG. 11. For example, what degree of the determination criterion set by the user is reached by the result of measurement by the inertial measurement unit 10 is displayed. For example, when the determination criterion set by the user is a threshold, what proportion of the threshold is reached by the measured value is displayed. Thus, the display mode can be switched between the first display mode, in which the result of determination based on the VC determination criterion is displayed, and the second display mode, in which the result of determination based on the determination criterion set by the user is displayed, via the mode changeover switch 80. When the display unit 60 formed of the light-emitting element groups 62, 64 is used, which of VC-A, VC-B, VC-C, VC-D, VC-E and the like is satisfied is displayed using the light-emitting element group 62, as clear from FIG. 7. Also, for example, which of L (low), M (middle), and H (high) the peak value is, is displayed using the light-emitting element group 64. That is, one of the light-emitting elements corresponding to the positions of L, M, H emits light, thus displaying which of the low level, the middle level, and the high level the peak value is. "A" in FIG. 7 represents an alarm state. When the light-emitting element corresponding to the position of "A" emits light, the user is notified that the alarm state has set in, such as where the measured value exceeds the threshold.

The mode changeover switch 80 also changes the unit of information displayed based on detection information. For example, in the case of measuring a vibration, the unit of the displayed measured value changes to the unit of vibration displacement (μm), the unit of vibration velocity (mm/s), and the unit of vibration acceleration (Gal) or the like, in response to an operation on the mode changeover switch 80, as shown in FIG. 10. Thus, in response to the operation on the mode changeover switch 80, the measured value can be displayed in various units to the user. Therefore, user-friendliness can be improved.

The inertial measurement unit 10 includes the processing unit 50 performing processing based on detection information. The processing unit 50 performs analysis processing on vibration information of a detection target. The display unit 70 displays information about the result of the analysis processing. The display unit 60 similarly displays information about the result of the analysis processing. For example, the processing unit 50 performs analysis processing such as FFT analysis on vibration information, based on detection information from the inertial sensor of the sensor unit 20. The display unit 70 displays, for example, a peak frequency of vibration, vibration displacement at the peak frequency, vibration velocity, or vibration acceleration or the like, as the information about the result of the analysis processing. Thus, even when detection information from the inertial sensor is difficult for the user to handle, the processing unit 50 performs analysis processing on this detection information and the display unit 70 displays information about the result of the analysis processing, enabling the user to easily grasp the vibration state of the detection target.

3. Wireless Communication Unit, Antenna Unit

The inertial measurement unit 10 according to this embodiment is provided with the wireless communication unit 90 for wirelessly transmitting, to outside, information based on detection information from the inertial sensor of the sensor unit 20, and the antenna unit 92 coupled to the wireless communication unit 90. The wireless communication unit 90 is, for example, a device performing near-field wireless communication such as Bluetooth (trademark registered, hereinafter simply referred to as BT) and is implemented by a wireless communication IC, which is an integrated circuit device, or the like. The wireless communication performed by the wireless communication unit 90 is not limited to BT and may be near-field wireless communication of another type such as ZigBee or Wi-SUN or may be Wi-Fi (trademark registered) wireless communication. Meanwhile, as described with reference to FIGS. 15 to 17 later, the sensor unit 20 includes the sensor substrate 210 provided with the inertial sensor, and the electrically conductive case 24 accommodating the sensor substrate 210. The case 24 includes, for example, a container 220 and a lid 222. The sensor substrate 210 is accommodated in an accommodation space formed by the container 220 and the lid 222. In FIG. 15, acceleration sensors 30X, 30Y, 30Z are provided as the inertial sensor at the sensor substrate 210. The acceleration sensors 30X, 30Y, 30Z detect information about an acceleration in directions along an X-axis, a Y-axis, and a Z-axis, respectively, as detection information. In FIGS. 16 and 17, an acceleration sensor 32 and angular velocity sensors 34X, 34Y, 34Z are provided as the inertial sensor at the sensor substrate 210. The acceleration sensor 32 detects information about an acceleration in directions along the X-axis, the Y-axis, and the Z-axis, as detection information. The angular velocity sensors 34X, 34Y, 34Z detect information about an angular velocity about the X-axis, the Y-axis, and the Z-axis, respectively, as detection information.

In FIGS. 15 to 17, the case 24 is formed of an electrically conductive material such as a metal. Since the sensor substrate 210 where the inertial sensor is installed is thus accommodated in the electrically conductive case 24, adverse effects of external electromagnetic waves or the like on the inertial sensor can be reduced. For example, when the electrically conductive case 24 is not provided, external electromagnetic waves or the like may cause the problem of drift in the detection information from the inertial sensor. However, providing the inertial sensor in the electrically conductive case 24 can restrain the occurrence of such a problem.

Meanwhile, it has been found that the sensitivity of the antenna unit 92 drops when such an electrically conductive case 24 is located near the antenna unit 92. For example, the antenna unit 92 is implemented by an inductor of a metal wiring formed at the substrate. For example, when the inductor of the metal wiring of the antenna unit 92 is located directly above the electrically conductive case 24, the sensitivity of the antenna unit 92 drops significantly.

Figure 12:
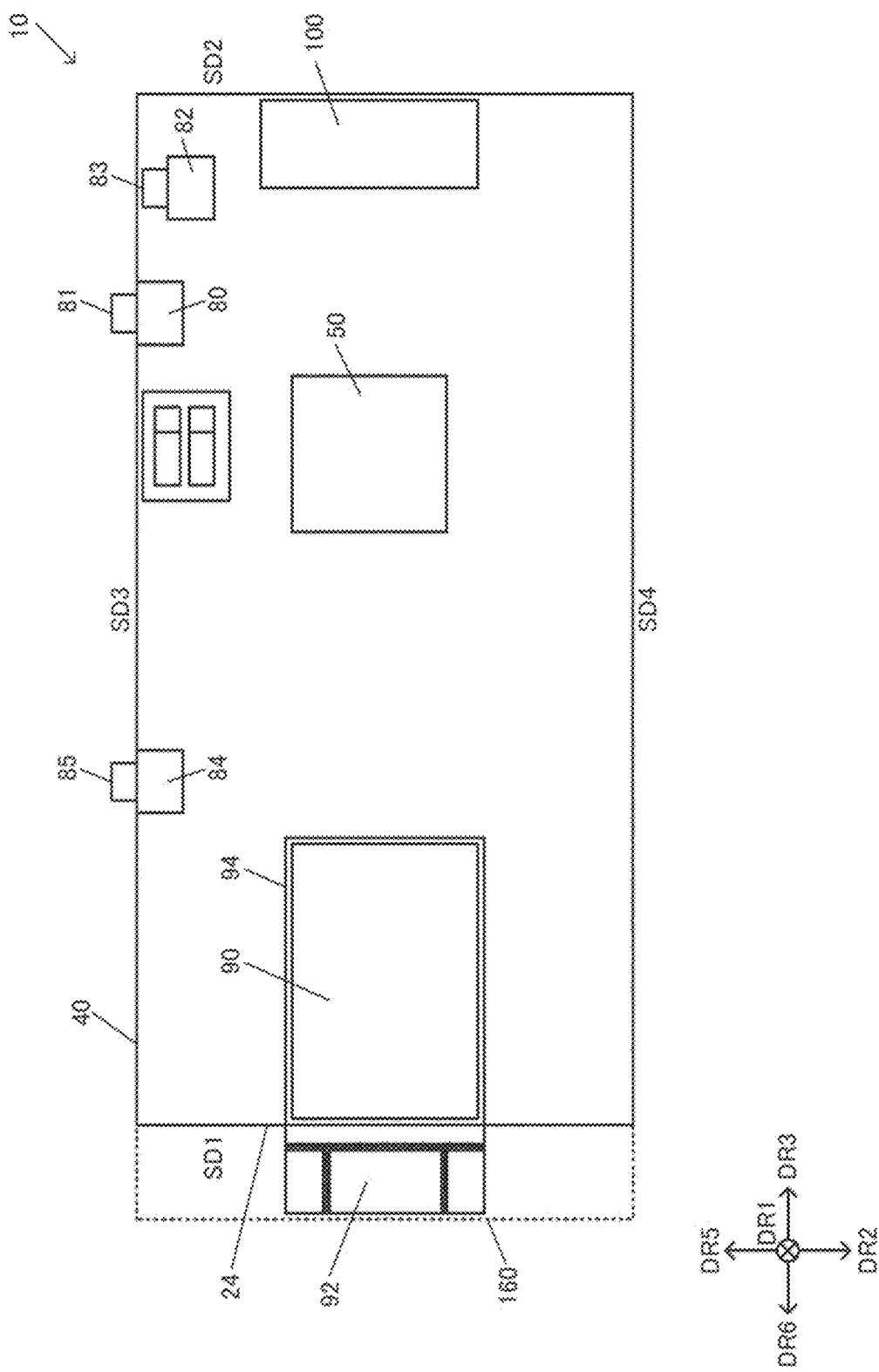
FIG. 12 is an explanatory view of a wireless communication unit and an antenna unit.

Thus, in this embodiment, as shown in FIG. 12, when the direction from the inertial measurement unit 10 toward the installation surface 2 is defined as DR1, the antenna unit 92 is provided in such a way as to protrude from a side of the case 24 of the sensor unit 20, as viewed in a plan view in the direction DR1. For example, in FIG. 12, the substrate 40 has sides SD1, SD2 as shorter sides opposite each other, and sides SD3, SD4 as longer sides opposite each other. The direction from the side SD1 toward the side SD2 is DR3. The opposite direction of DR3 is DR6. The direction from the side SD3 toward the side SD4 is DR2. The opposite direction of DR2 is DR5. The antenna unit 92 protrudes from the side SD1, which is a shorter side of the substrate 40. The antenna unit 92 also protrudes from the side of the sensor unit 20 corresponding to the side SD1. Specifically, the antenna unit 92 is provided in such a way as to protrude in the direction DR6 from the side SD1.

Thus, for example, the antenna unit 92 is not located directly above the electrically conductive case 24 of the sensor unit 20. Specifically, the inductor of the metal wiring of the antenna unit 92 is not located directly above the electrically conductive case 24. Therefore, the drop in the sensitivity of the antenna unit 92 due to the electrically conductive case 24 can be restrained. That is, when the antenna unit 92 is provided in the direction DR3 from the side SD1 in FIG. 12, the presence of the electrically conductive case 24 causes a drop in the sensitivity of the antenna unit 92. However, when the antenna unit 92 is provided in the direction DR6 from the side SD1 as shown in FIG. 12, the electrically conducive case 24 is not present directly below the antenna unit 92 and the sensitivity of the antenna unit 92 can be improved accordingly.

As described above, the inertial measurement unit 10 according to this embodiment includes the sensor unit 20 having at least one inertial sensor, the wireless communication unit 90 wirelessly transmitting information based on detection information from the inertial sensor, and the antenna unit 92 coupled to the wireless communication unit 90. Providing the wireless communication unit 90 and the antenna unit 92 in this way enables wireless transmission of information based on detection information from the inertial sensor, to outside. Thus, the information based on the detection information can be transmitted to an external device, for example, even without coupling the inertial measurement unit 10 to the external device. Therefore, user-friendliness can be improved.

The sensor unit 20 includes the inertial sensor, the sensor substrate 210 provided with the inertial sensor, and the electrically conductive case 24 accommodating the sensor substrate 210. That is, in FIG. 15, the sensor substrate 210 provided with the acceleration sensors 30X, 30Y, 30Z as the inertial sensor is accommodated in the case 24. In FIGS. 16 and 17, the sensor substrate 210 provided with the acceleration sensor 32 and the angular velocity sensors 34X, 34Y, 34Z as the inertial sensor is accommodated in the case 24. Thus, the inertial sensor is accommodated in the electrically conductive case 24 and therefore deterioration in the accuracy of detection information from the inertial sensor due to external electromagnetic waves or the like can be restrained.

As shown in FIG. 12, in the inertial measurement unit 10 according to this embodiment, the antenna unit 92 is provided in such a way as to protrude from a side of the case 24, as viewed in a plan view in the direction DR1 toward the installation surface 2. That is, the antenna unit 92 protrudes from the side SD1 of the substrate 40 and also protrudes from the side of the case 24 below corresponding to the side SD1. Thus, the drop in the sensitivity of the antenna unit 92 due to the electrically conductive case 24 can be restrained. Therefore, both of restraint on the deterioration in the accuracy of detection of the inertial sensor by accommodating the inertial sensor in the electrically conductive case 24 and improvement in the sensitivity of the antenna unit 92 can be achieved.

In the inertial measurement unit 10 having the configuration described with reference to FIG. 12, the wireless communication unit 90 and the antenna unit 92 need not necessarily be provided at the substrate 40 and may be provided, for example, at other substrates than the substrate 40. For example, the wireless communication unit 90 and the antenna unit 92 may be provided at the substrate 48, where the display unit 70 is provided, instead of the substrate 40, where the processing unit 50 or the like is provided. Alternatively, various modified embodiments, for example, installing the wireless communication unit 90 and the antenna unit 92 at the top surface of the sensor unit 20, can be employed.

The inertial measurement unit 10 has the substrate 40 provided with the wireless communication unit 90, and the protection plate 160. As described with reference to FIGS. 1 and 2, the substrate 40 is provided between the sensor unit 20 and the protection plate 160. As shown in FIG. 12, the antenna unit 92 does not protrude from the protection plate 160, as viewed in a plan view in the direction DR1. That is, the antenna unit 92 protrudes in the direction DR6 from the side SD1 of the substrate 40 and the corresponding side of the sensor unit 20 but does not protrude in the direction DR6 from the corresponding side of the protection plate 160. For example, the electrically conductive case 24 of the sensor unit 20 is not present below the antenna unit 92, whereas the protection plate 160 is provided above the antenna unit 92 in such a way as to cover the antenna unit 92. Providing the antenna unit 92 in such a way as not to protrude from the protection plate 160 as viewed in a plan view and providing the protection plate 160 in such a way as to cover the antenna unit 92 can prevent a situation such as where an unwanted impact is applied to the antenna unit 92. For example, a situation where a finger of the user's hand or the like accidentally touches the antenna unit 92 and causes damage or the like to the antenna unit 92, can be restrained. Therefore, the sensitivity of the antenna unit 92 can be improved by providing the antenna unit 92 in such a way as to protrude from the electrically conductive case 24 as viewed in a plan view, and the antenna unit 92 can be protected from an external impact by providing the antenna unit 92 in such a way as not to protrude from the protection plate 160 as viewed in a plan view.

The inertial measurement unit 10 includes the substrate 40 provided with the wireless communication unit 90. The antenna unit 92 is provided in such a way as to protrude from the side SD1, which is a shorter side of the substrate 40. Specifically, a communication substrate 94 is installed at the substrate 40, where the processing unit 50 or the like is provided. The wireless communication unit 90 and the antenna unit 92 are provided at the communication substrate 94. That is, a wireless communication IC as the wireless communication unit 90 is installed at the communication substrate 94, and an inductor of a metal wiring is formed at a substrate part protruding from the side SD1 of the substrate 40, of the communication substrate 94, thus forming the antenna unit 92. The substrate part where the wireless communication unit 90 is installed and the substrate part where the antenna unit 92 is formed may be formed as a single substrate or may be formed as separate substrates. Providing the antenna unit 92 in such a way as to protrude from the side SD1 of the substrate 40 in this way can reduce the risk of an unwanted impact being applied to the antenna unit 92. For example, a situation such as where a finger of the user's hand touches the antenna unit 92 and applies an unwanted impact to the antenna unit 92 when the user holds the inertial measurement unit 10 on the two longer sides with the palm in contact with the top surface thereof, can be restrained.

As shown in FIG. 12, the wireless communication unit 90 is provided at the side SD1, which is a shorter side of the substrate 40. Specifically, the wireless communication unit 90 is arranged along the side SD1 in the direction DR3 from the side SD1. The antenna unit 92 coupled to the wireless communication unit 90 is provided in such a way as to protrude in the direction DR6 from the side SD1. Thus, the antenna unit 92 can be electrically coupled via a short path to the wireless communication unit 90 arranged at the side SD1 of the substrate 40, and the sensitivity of the antenna unit 92 can be improved by making the antenna unit 92 protrude from the side SD1. Therefore, the wireless communication unit 90 and the antenna unit 92 can be installed in a compact form at the substrate 40, and improvement in the sensitivity of the antenna unit 92 can be achieved.

The inertial measurement unit 10 includes the substrate 40 provided with the wireless communication unit 90, and the processing unit 50 provided at the substrate 40 and performing processing based on detection information from the inertial sensor of the sensor unit 20. The wireless communication unit 90 transmits the information processed by the processing unit 50. For example, when the processing unit 50 performs processing to process detection information from the inertial sensor, the wireless communication unit 90 wirelessly transmits, for example, the processed detection information to outside. When the processing unit 50 performs analysis processing on detection information from the inertial sensor, the wireless communication unit 90 transmits, for example, information about the result of the analysis processing to outside. Thus, instead of detection information from the inertial sensor itself, information resulting from predetermined processing performed on the detection information by the processing unit 50 can be wirelessly transmitted to outside by the wireless communication unit 90. Therefore, an external device of the inertial measurement unit 10 need not perform the processing performed by the processing unit 50 of the inertial measurement unit 10, and reduction in processing load and cost reduction or the like of the measuring system including the inertial measurement unit 10 can be achieved.

The handling of the detection information from the inertial sensor is difficult and needs expertise and therefore has the problem of poor user-friendliness. However, as the inertial measurement unit 10 transmits the information processed by the processing unit 50, information that is easy for the user to handle can be transmitted and therefore user-friendliness can be improved.

As shown in FIG. 12, in the inertial measurement unit 10 according to this embodiment, the antenna unit 92 is provided in such a way as to protrude from the side SD1 of the substrate, and the processing unit 50 is provided between the wireless communication unit 90 and the side SD2 opposite the side SD1. The side SD1 is the first shorter side. The side SD2 is the second shorter side. For example, when the direction from the side SD1 toward the side SD2 of the substrate 40 is DR3 and the opposite direction of the direction DR3 is DR6, the antenna unit 92 is provided in the direction DR6 from the wireless communication unit 90 in such a way as to protrude from the side SD1 of the substrate 40. The wireless communication unit 90 is provided in the direction DR3 from the antenna unit 92. The processing unit 50 is provided in the direction DR3 from the wireless communication unit 90. Thus, the antenna unit 92, the wireless communication unit 90, and the processing unit 50 can be efficiently arranged along the direction from the side SD1, which is a shorter side of the substrate 40, toward the opposite side SD2. For example, the antenna unit 92, the wireless communication unit 90, and the processing unit 50 can be arrayed in this order along the direction from the side SD3 to the side SD4, which is a longer-side direction of the substrate 40. Thus, the efficiency of installation of circuit components at the substrate 40 can be improved.

The inertial measurement unit 10 includes the interface unit 100 for wired communication of data with outside. The interface unit 100 is arranged at the side SD2, which is a shorter side of the substrate. Specifically, the interface unit 100 is arranged along the side SD2 in the direction DR6 from the side SD2. The interface unit 100 is, for example, a circuit implementing a communication interface of UART, GPI, or SPI or the like. The provision of such an interface unit 100 enables transmission of information based on detection information from the inertial sensor to an external device and acceptance of a command from the external device, via a broadly used wired communication interface of UART, GPI, or SPI or the like. Since the interface unit 100 is provided at the side SD2 of the substrate 40, the antenna unit 92, the wireless communication unit 90, the processing unit 50, and the interface unit 100 can be efficiently arranged along the longer-side direction of the substrate 40. Thus, the efficiency of installation of circuit components at the substrate 40 can be improved.

As shown in FIG. 12, at least one of the mode changeover switch 80, the reset switch 82, and the measurement start switch 84 is provided at the side SD3, which is a longer side of the substrate 40. Thus, the wireless communication unit 90, the processing unit 50, and the interface unit 100 can be arranged, using an area between the side SD1 and the side SD2, which are the shorter sides of the substrate 40, and the mode changeover switch 80, the reset switch 82, and the measurement start switch 84 can be arranged, using an area along the side SD3, which is a longer side of the substrate 40. Therefore, an efficient installation layout can be achieved. Also, the inertial measurement unit 10 includes at least one fixing member 11, 12, 13 for removably fixing the sensor unit 20 and the substrate 40, where the wireless communication unit 90 or the like is provided. Thus, as described above, the extensibility of the inertial measurement unit 10 can be improved, and a situation where an unwanted vibration or the like due to resonance or the like is transmitted to the inertial measurement unit 10 and adversely affects measurement can be restrained.

Figure 13:
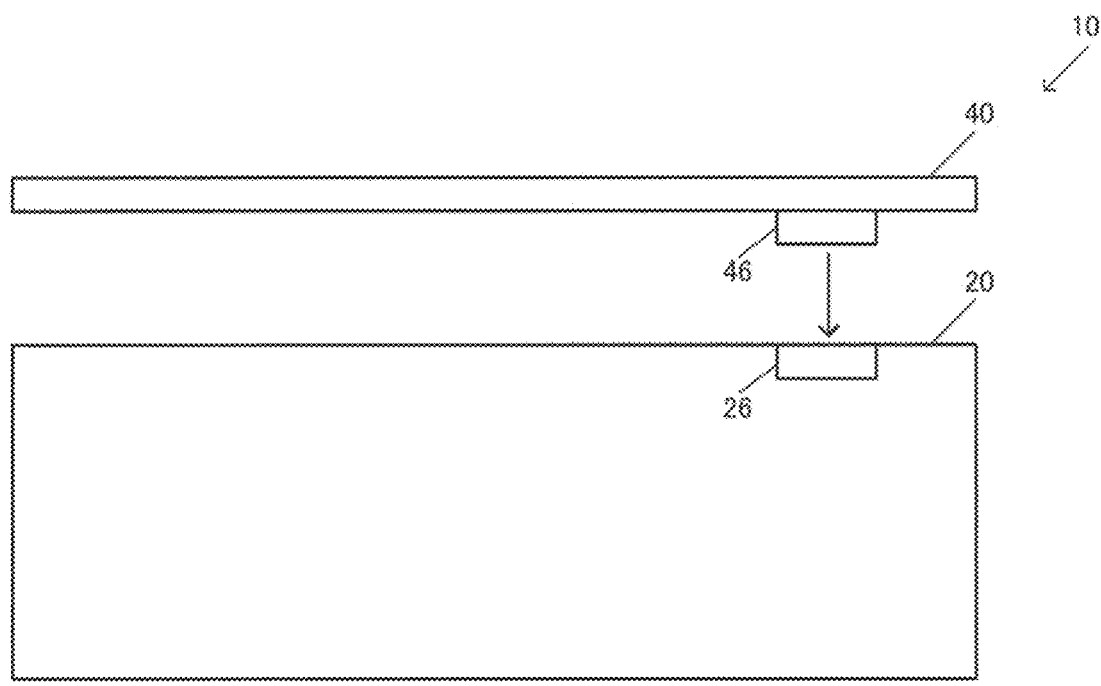
FIG. 13 is an explanatory view showing the coupling between a sensor-side connector and a substrate-side connector.
Figure 13:
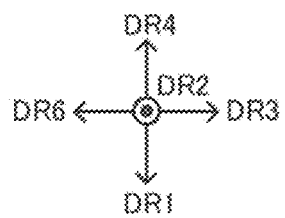

As shown in FIG. 13, in the inertial measurement unit 10 according to this embodiment, the sensor unit 20 has the sensor-side connector 26 at the surface facing the substrate 40. That is, the connector 26 is provided at the top surface of the sensor unit 20. The substrate 40 has a substrate-side connector 46 coupled to the sensor-side connector 26, at the surface facing the sensor unit 20. That is, the connector 46 is provided at the bottom surface of the substrate 40. The connector 46 of the substrate 40 is electrically coupled to the connector 26 of the sensor unit 20. Specifically, in the state where the sensor unit 20 and the substrate 40 are fixed together via the fixing members 11, 12, 13, as shown in FIGS. 1 and 2, the connector 26 of the sensor unit 20 and the connector 46 of the substrate 40 are electrically coupled together. Thus, detection information from the inertial sensor of the sensor unit 20 can be communicated to the substrate 40 via the connectors 26, 46. The processing unit 50 provided at the substrate 40 can perform processing based on the detection information from the inertial sensor. The display unit 60 provided at the substrate 40 can perform a display based on the detection information from the inertial sensor. The connector 26 is, for example, a male connector formed of a plurality of pin terminals. The connector 46 is, for example, a female connector to which a male connector can be coupled.

Figure 14:
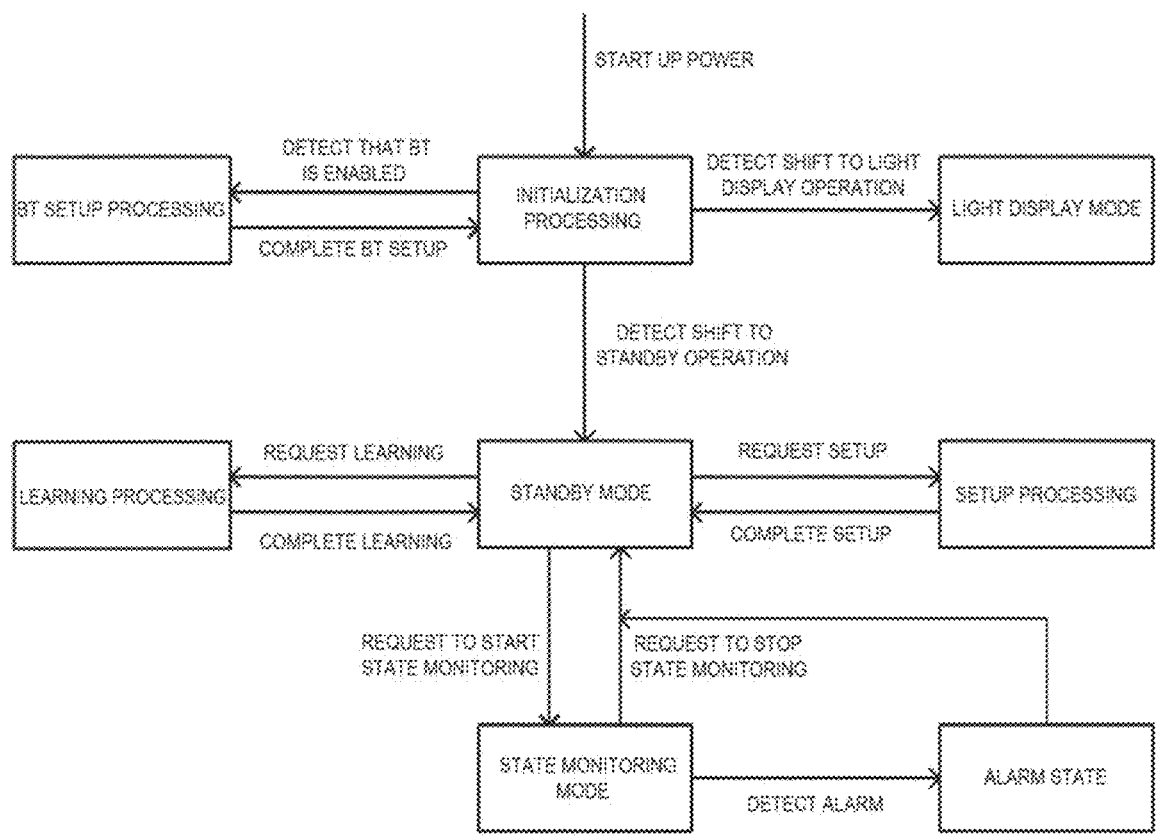
FIG. 14 is a state transition diagram explaining an operation of the inertial measurement unit.

FIG. 14 is a state transition diagram explaining an operation of the inertial measurement unit 10 according to this embodiment. When the inertial measurement unit 10 is supplied with electric power and starts up, the inertial measurement unit 10 first shifts to the state of initialization processing. When it is detected that BT (Bluetooth (trademark registered)) is enabled, based on selection via the slide switch 86, the inertial measurement unit 10 performs BT setup and then returns to the state of initialization processing on completion of the setup. When BT is enabled, wireless communication is disabled. Meanwhile, when a shift to a light display operation is detected, based on selection via the slide switch 86, the inertial measurement unit 10 shifts to a light display mode. In the light display mode, the interface unit 100 shifts into a GPIO output mode, enabling light display via PATLITE (trademark registered) or the like using the inertial measurement unit 10.

When BT being enabled or a shift to the light display mode is not selected via the slide switch 86, the inertial measurement unit 10 assumes that a shift to a standby operation is detected, and therefore shifts to a standby mode. When learning is requested in the standby mode, for example, by a long press on the measurement start switch 84 or by a command, the inertial measurement unit 10 shifts to a learning mode and performs learning processing. In the learning mode, for example, a predetermined light-emitting element in the display unit 60 flashes on and off, or for example, the letters of "LEARNING" are displayed at the display unit 70, thus notifying the user that learning is underway. Then, measurement is performed during a learning period in the learning mode. Based on the result of the measurement during the learning period, a measurement threshold as measurement criteria information for inertial measurement is found. The threshold thus found is stored into the memory 102, which is a non-volatile memory. On completion of the learning processing, the inertial measurement unit 10 returns to the standby mode. When setup is requested in the standby mode, for example, by a command given from an external device or the like, the inertial measurement unit 10 performs various kinds of setup processing about the inertial measurement unit 10. On completion of the setup, the inertial measurement unit 10 returns to the standby mode.

Also, when a request to start state monitoring is made in the standby mode by a press on the measurement start switch 84, the inertial measurement unit 10 shifts to a state monitoring mode. In the state monitoring mode, the display unit 60 and the display unit 70 display the result of measurement. At this time, a press on the mode changeover switch 80 changes the display mode. Also, for example, when the measured value exceeds the threshold in the state monitoring mode, the inertial measurement unit 10 shifts to an alarm state and, for example, a light-emitting element for alarm in the display unit 60 flashes on and off. As the inertial measurement unit 10 shifts to the alarm state, log data is saved. When a request to stop state monitoring is made in the state monitoring mode or in the alarm state, for example, by another press on the measurement start switch 84, the inertial measurement unit 10 returns to the standby mode.

In the inertial measurement unit 10 according to this embodiment as described above, the user first installs the inertial measurement unit 10 at a device or floor surface and presses the measurement start switch 84. For example, the user holds the inertial measurement unit 10 with the palm in contact with the top surface of the inertial measurement unit 10 and presses the measurement start switch 84, using a finger of the hand or the like. To cause the inertial measurement unit 10 to learn a threshold, the user long-presses the measurement start switch 84, which causes the inertial measurement unit 10 to learn a measurement threshold. The user then presses the measurement start switch 84. After pressing the measurement start switch 84, the user waits for a predetermined measurement time. For example, the measurement time is a duration of 5 to 10 seconds. The length of the measurement time can be set. As the measurement time ends, a display via the LED as the light-emitting element in the display unit 60 or a display on the display panel 72 of the display unit 70 notifies the user of the result of the measurement. At this time, the user can switch between various display modes by pressing the mode changeover switch 80. By pressing the measurement start switch 84 again, the user can stop the state monitoring mode and shift the inertial measurement unit 10 to the standby mode. In this way, with the inertial measurement unit 10 according to this embodiment, the user can carry out measurement by a simple operation. Since the display units 60,

70 display information based on detection information from the inertial sensor, the user can check the result of measurement via the display of information that is easy to understand, and this can improve convenience. The user can also check the result of measurement in various display modes by operating the mode changeover switch 80. Also, since the inertial measurement unit 10 is provided with the wireless communication unit 90 and the antenna unit 92, the inertial measurement unit 10 can wirelessly transmit information based on detection information from the inertial sensor, to an external device. In this case, since the antenna unit 92 is provided in such a way as to protrude from the main surface of the case 24 of the sensor unit 20, wireless communication can be performed with high antenna sensitivity.

4. Sensor Unit

FIG. 15 shows a first configuration example of the sensor unit 20. FIG. 15 is an exploded perspective view of the sensor unit 20. The sensor unit 20 shown in FIG. 15 includes the sensor substrate 210 provided with at least one acceleration sensor as at least one inertial sensor, and the case 24 accommodating the sensor substrate 210. In FIG. 15, the acceleration sensors 30X, 30Y, 30Z detecting an acceleration in directions along the X-axis, the Y-axis, and the Z-axis, respectively, are provided at the sensor substrate 210, as at least one acceleration sensor. The acceleration sensors 30X, 30Y, 30Z are installed at the sensor substrate 210 in such a way that the main surfaces of the acceleration sensors 30X, 30Y, 30Z are orthogonal to the X-axis, the Y-axis, and the Z-axis, respectively. The acceleration sensors 30X, 30Y, 30Z are, for example, acceleration sensors using a quartz crystal vibrator and can detect an acceleration with higher accuracy than a MEMS (micro-electromechanical systems) acceleration sensor. Thus, a vibration or the like of a device or floor surface can be detected with high accuracy. In FIG. 15, the three acceleration sensors 30X, 30Y, 30Z for detecting an acceleration on the three axes are provided at the sensor substrate 210. However, various modified embodiments can be employed, such as providing one acceleration sensor for detecting an acceleration on one axis at the sensor substrate 210, or providing two acceleration sensors for detecting an acceleration on two axes at the sensor substrate 210.

Also, the processing unit 212 implemented by an ASIC, microcomputer or the like is provided at the sensor substrate 210. For example, the processing unit 212 of the sensor unit 20 may execute a part or all of the processing carried out by the processing unit 50 of the inertial measurement unit 10. At a second surface, that is, the back side of a first surface, which is the main surface of the sensor substrate 210 where the acceleration sensors 30X, 30Y, 30Z are provided, the connector 26 formed of a plurality of connector terminals is provided. As described with reference to FIG. 13, the connector 26 of the sensor unit 20 is coupled to the connector 46 at the back side of the substrate 40 in the inertial measurement unit 10.

The case 24 is formed of an electrically conductive material such as a metal and has the container 220 and the lid 222. The sensor substrate 210 is accommodated in the accommodation space formed by the container 220 and the lid 222. The container 220 and the lid 222 are fixed together and airtightly sealed by a fixing member such as a screw. A sealing member 224 as a buffer member is provided between the lid 222 and the sensor substrate 210.

FIGS. 16 and 17 show a second configuration example of the sensor unit 20. FIG. 16 is an exploded perspective view of the sensor unit 20. FIG. 17 is a plan view of the sensor substrate 210. The sensor unit 20 shown in FIGS. 16 and 17 includes the sensor substrate 210 provided with at least one acceleration sensor and at least one angular velocity sensor, as at least one inertial sensor, and the case 24 accommodating the sensor substrate 210. In FIGS. 16 and 17, the acceleration sensor 32 detecting an acceleration in directions along the X-axis, the Y-axis, and the Z-axis is provided at the sensor substrate 210, as at least one acceleration sensor. Inside the acceleration sensor 32, a sensor element detecting an acceleration in the X-axis direction and the Y-axis direction and a sensor element detecting an acceleration in the Z-axis direction are provided. These sensor elements are, for example, MEMS sensor elements. Also, various modified embodiments can be employed, such as providing individual acceleration sensors for the X-axis, the Y-axis, and the Z-axis, respectively, or providing an acceleration sensor for two axes or one axis of the X-axis, the Y-axis, and the Z-axis, at the sensor substrate 210. In FIGS. 16 and 17, the angular velocity sensors 34X, 34Y, 34Z detecting an angular velocity about the X-axis, the Y-axis, and the Z-axis, respectively, are provided as at least one angular velocity sensor. The angular velocity sensors 34X, 34Y, 34Z are installed at the sensor substrate 210 in such a way that the main surfaces of the angular velocity sensors 34X, 34Y, 34Z are orthogonal to the X-axis, the Y-axis, and the Z-axis, respectively. The angular velocity sensors 34X, 34Y, 34Z are, for example, gyro sensors detecting an angular velocity, using a quartz crystal vibrator. Providing not only an acceleration sensor but also an angular velocity sensor at the sensor substrate 210 in this way enables not only detection of a vibration or the like but also detection of a tilt, attitude change and the like of a target object. In FIGS. 16 and 17, the three angular velocity sensors 34X, 34Y, 34Z for detecting an angular velocity about the three axes are provided at the sensor substrate 210. However, various modified embodiments can be employed, such as providing one angular velocity sensor for detecting an angular velocity about one axis at the sensor substrate 210, or providing two angular velocity sensors for detecting an angular velocity about two axes at the sensor substrate 210.

As shown in FIG. 17, at the first surface, which is the main surface of the sensor substrate 210 where the acceleration sensor 32 or the like is provided, the connector 26 formed of a plurality of connector terminals is provided. As described with reference to FIG. 13, the connector 26 of the sensor unit 20 is coupled to the connector 46 at the back side of the substrate 40 in the inertial measurement unit 10. At the second surface, which is the back side of the sensor substrate 210, a processing unit, not illustrated, implemented by an ASIC, microcomputer or the like is provided. For example, the processing unit of the sensor unit 20 may execute a part or all of the processing carried out by the processing unit 50 of the inertial measurement unit 10.

The case 24 is formed of an electrically conductive material such as a metal and has the container 220 and the lid 222. The sensor substrate 210 is accommodated in the accommodation space formed by the container 220 and the lid 222. The container 220 and the lid 222 are fixed together and airtightly sealed by a fixing member such as a screw. The sealing member 224 as a buffer member is provided between the lid 222 and the sensor substrate 210.

As described above, the inertial measurement unit according to this embodiment includes: a sensor unit having at least one inertial sensor; a display unit performing a display based on detection information from the inertial sensor; and a mode changeover switch. The mode changeover switch changes a display mode of the display unit.

According to this embodiment, the display unit provided in the inertial measurement unit can perform a display based on detection information from the inertial sensor of the sensor unit. Therefore, the work of checking the result of measurement can be simplified. Also, since the display mode of the display unit can be changed by operating the mode changeover switch, various demands about the display form of the result of measurement can be met.

In the embodiment, when a direction from the inertial measurement unit toward an installation surface for the inertial measurement unit is defined as a first direction and a direction orthogonal to the first direction is defined as a second direction, the mode changeover switch may have a moving part movable in the second direction. A movement of the moving part of the mode changeover switch may give an instruction to change the display mode of the display unit.

Thus, the user can give an instruction to change the display mode by a simple operation of moving the moving part of the mode changeover switch in the second direction, which is orthogonal to the first direction from the inertial measurement unit toward the installation surface.

In the embodiment, the moving part of the mode changeover switch, when not pressed, may protrude from a side of the sensor unit as viewed in a plan view in the first direction.

Thus, the display mode of the display unit is changed by a simple operation of pressing the moving part of the mode changeover switch protruding from the side of the sensor unit when not pressed. Therefore, user-friendliness can be improved.

In the embodiment, the inertial measurement unit may include a measurement start switch for starting measurement by the inertial measurement unit.

Thus, measurement by the inertial measurement unit can be started by a simple operation of operating the measurement start switch. Therefore, user-friendliness can be improved.

In the embodiment, when a direction from the inertial measurement unit toward an installation surface for the inertial measurement unit is defined as a first direction and a direction orthogonal to the first direction is defined as a second direction, the measurement start switch may have a moving part movable in the second direction. A movement of the moving part of the measurement start switch may give an instruction to start measurement by the inertial measurement unit.

Thus, the user can give an instruction to start measurement by the inertial measurement unit by a simple operation of moving the moving part of the measurement start switch in the second direction, which is orthogonal to the first direction from the inertial measurement unit toward the installation surface.

In the embodiment, the inertial measurement unit may include a memory, and a teach switch for giving an instruction to store measurement criteria information for inertial measurement into the memory.

Thus, the inertial measurement unit can be made to learn measurement criteria information corresponding to a measurement target, and measurement using the measurement criteria information can be realized.

In the embodiment, when a direction from the inertial measurement unit toward an installation surface for the inertial measurement unit is defined as a first direction and a direction orthogonal to the first direction is defined as a second direction, the teach switch may have a moving part movable in the second direction. A movement of the moving part of the teach switch may give an instruction to store the measurement criteria information into the memory.

Thus, the user can give an instruction to store measurement criteria information into the memory by a simple operation of moving the moving part of the teach switch in the second direction, which is orthogonal to the first direction from the inertial measurement unit toward the installation surface.

In the embodiment, the inertial measurement unit may include a substrate where the mode changeover switch is provided.

Thus, the mode changeover switch can be installed in a compact form in the inertial measurement unit.

In the embodiment, the inertial measurement unit may include at least one fixing member removably fixing the sensor unit and the substrate together.

Thus, the sensor unit and the substrate incorporated in the inertial measurement unit can be freely changed and the extensibility of the inertial measurement unit ca be improved.

In the embodiment, the inertial measurement unit may include a first substrate and a second substrate, as the substrate. The mode changeover switch may be provided at the first substrate. The display unit may be provided at the second substrate. The first substrate may be provided between the sensor unit and the second substrate.

Thus, when the mode changeover switch provided at the first substrate is operated, the display mode of the display unit provided at the second substrate changes. Since the mode changeover switch is provided at the first substrate provided between the sensor unit and the second substrate, the operability of the mode changeover switch can be improved.

In the embodiment, the display unit may display, in a first display mode, a result of determination based on a first determination criterion, and in a second display mode, a result of determination based on a second determination criterion, as a result of determination based on the detection information.

Thus, as the user operates the mode changeover switch, the result of determination about measurement is displayed at the display unit, based on different determination criteria. The result of determination based on various determination criteria can be presented to the user.

In the embodiment, the first determination criterion may be a determination criterion of VC (vibration criteria), and the second determination criterion may be a determination criterion set by a user.

Thus, the display mode can be switched between the first display mode, in which the result of determination based on the VC determination criterion is displayed, and the second display mode, in which the result of determination based on the determination criterion set by the user is displayed, via the mode changeover switch.

In the embodiment, a unit of information displayed based on the detection information may be changed via the mode changeover switch.

Thus, the measured value can be displayed in various units to the user via the operation of the mode changeover switch. Therefore, user-friendliness can be improved.

In the embodiment, the inertial measurement unit may include a processing unit performing processing based on the detection information. The processing unit may perform analysis processing on vibration information about a detection target. The display unit may display information about a result of the analysis processing.

Thus, as the processing unit performs analysis processing on detection information from the inertial sensor and the display unit displays information about the result of the analysis processing, the user can easily grasp the vibration state of the detection target.

In the embodiment, the sensor unit may include a sensor substrate provided with at least one acceleration sensor as the at least one inertial sensor, and a case accommodating the sensor substrate.

Thus, the display unit provided in the inertial measurement unit can perform a display based on detection information from the acceleration sensor provided at the sensor substrate of the sensor unit. Therefore, the work of checking the result of measurement can be simplified.

In the embodiment, the sensor unit may include a sensor substrate provided with at least one acceleration sensor and at least one angular velocity sensor, as the at least one inertial sensor, and a case accommodating the sensor substrate.

Thus, the display unit provided in the inertial measurement unit can perform a display based on detection information from the acceleration sensor and the angular velocity sensor provided at the sensor substrate of the sensor unit. Therefore, the work of checking the result of measurement can be simplified.

The embodiment has been described above in detail. However, a person skilled in the art will readily understand that various modifications can be made without substantially departing from the new matters and effects of the present disclosure. Therefore, such modifications are understood as included in the scope of the present disclosure. For example, a term described along with a different term having a broader meaning or the same meaning, at least once in the specification or drawings, can be replaced with the different term in any part of the specification or drawings. Any combination of the embodiment and the modifications is included in the scope of the present disclosure. The configuration, operation and the like of the inertial measurement unit are not limited those described in the embodiment and can be carried out with various modifications.

What is claimed is:

1. An inertial measurement unit comprising:
    a sensor unit having at least one inertial sensor;
    a first substrate on which the at least one inertial sensor is disposed;
    a display unit configured to display detection information corresponding to a value detected by the at least one inertial sensor;
    a second substrate on which the display unit is disposed, the second substrate stacking on the first substrate via a first space along a first direction;
    a mode changeover switch configured to change a display mode of the display unit; and
    a third substrate on which the mode changeover switch is disposed, the third substrate stacking on the first substrate via a second space along the first direction,
    wherein the third substrate is located between the first substrate and the second substrate along the first direction.

2. The inertial measurement unit according to claim 1, wherein
    the mode changeover switch has a moving part movable along a second direction orthogonal to the first direction, and
    a movement of the moving part of the mode changeover switch gives an instruction to change the display mode of the display unit.

3. The inertial measurement unit according to claim 2, wherein
    the moving part of the mode changeover switch, when not pressed, protrudes from a side of the sensor unit when viewed along the first direction.

4. The inertial measurement unit according to claim 1, further comprising
    a measurement start switch for starting measurement by the inertial measurement unit.

5. The inertial measurement unit according to claim 4, wherein
    the measurement start switch has a moving part movable in a second direction orthogonal to the first direction, and
    a movement of the moving part of the measurement start switch gives an instruction to start measurement by the inertial measurement unit.

6. The inertial measurement unit according to claim 1, further comprising:
    a memory; and
    a teach switch for giving an instruction to store measurement criteria information for inertial measurement into the memory.

7. The inertial measurement unit according to claim 6, wherein
    the teach switch has a moving part movable in a second direction orthogonal to the first direction, and
    a movement of the moving part of the teach switch gives an instruction to store the measurement criteria information into the memory.

8. The inertial measurement unit according to claim 1, further comprising
    at least one fixing member removably fixing the sensor unit and the third substrate together.

9. The inertial measurement unit according to claim 1, wherein
    the display unit is configured to display, in a first display mode, a result of determination based on a first determination criterion, as a result of determination based on the detection information, and
    the display unit is configured to display, in a second display mode, a result of determination based on a second determination criterion, as the result of determination based on the detection information.

10. The inertial measurement unit according to claim 9, wherein
    the first determination criterion is a determination criterion of vibration criteria, and the second determination criterion is a determination criterion set by a user, and
    the vibration criteria are ambient vibration criteria.

11. The inertial measurement unit according to claim 1, wherein
    a unit of information displayed based on the detection information is changed via the mode changeover switch.

12. The inertial measurement unit according to claim 1, further comprising
    a processing circuit configured to perform processing based on the detection information, wherein
    the processing circuit is configured to perform analysis processing on vibration information about a detection target, and
    the display unit is configured to display information about a result of the analysis processing.

13. The inertial measurement unit according to claim 1, wherein
    the sensor unit includes:
        the first substrate provided with at least one acceleration sensor as the at least one inertial sensor; and
        a case accommodating the first substrate.

14. The inertial measurement unit according to claim 1, wherein
the sensor unit includes:
  the first substrate provided with at least one acceleration sensor and at least one angular velocity sensor, as the at least one inertial sensor; and
  a case accommodating the first substrate.

* * * * *